(12) United States Patent
Wakatsuki et al.

(10) Patent No.: US 11,448,802 B2
(45) Date of Patent: Sep. 20, 2022

(54) GLASS ARTICLE AND PRODUCTION METHOD FOR GLASS ARTICLE

(71) Applicant: AGC Inc., Chiyoda-ku (JP)

(72) Inventors: Hiroshi Wakatsuki, Tokyo (JP); Yusuke Kobayashi, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 488 days.

(21) Appl. No.: 15/352,110

(22) Filed: Nov. 15, 2016

(65) Prior Publication Data

US 2017/0059749 A1 Mar. 2, 2017

Related U.S. Application Data

(63) Continuation of application No. PCT/JP2015/063686, filed on May 12, 2015.

(30) Foreign Application Priority Data

May 15, 2014 (JP) .............................. JP2014-101775

(51) Int. Cl.
*G02B 5/02* (2006.01)
*C03C 17/02* (2006.01)
(Continued)

(52) U.S. Cl.
CPC .............. *G02B 5/0226* (2013.01); *B05D 1/02* (2013.01); *B05D 3/0254* (2013.01); *B05D 5/061* (2013.01);
(Continued)

(58) Field of Classification Search
CPC ..... C03B 25/025; C03B 23/02; C03B 23/023; C03B 32/00; G02B 5/0226; G02B 1/18; G02B 1/11; B05D 1/02; B05D 3/0254; B05D 5/061; B32B 17/00; B32B 17/06; B32B 2457/20; B32B 2457/202; B29K 2509/08; B41M 1/34; B29L 2031/3475; C08K 3/40; C09K 11/59; C09D 5/006; H05K 5/0017; H05K 5/0086; H05K 5/03;
(Continued)

(56) References Cited

U.S. PATENT DOCUMENTS 8,007,902 B2 8/2011 Smith
2003/0064198 A1* 4/2003 Thomsen .............. B08B 17/065
428/172
(Continued)

FOREIGN PATENT DOCUMENTS

CN 103228438 A 7/2013
JP 61-197434 A 9/1986
(Continued)

OTHER PUBLICATIONS

Extended European Search Report dated Jan. 31, 2018 in Patent Application No. 15793456.3, 12 pages.
(Continued)

*Primary Examiner* — Jie Lei
(74) *Attorney, Agent, or Firm* — Oblon, McClelland, Maier & Neustadt, L.L.P.

(57) ABSTRACT

The glass article has a three-dimensional shape. The glass article contains a first surface and at least one second surface opposite to the first surface, and contains a bent part in at least one place of the first surface or the second surface.

41 Claims, 21 Drawing Sheets

(51) Int. Cl.
| | |
|---|---|
| *C03C 21/00* | (2006.01) |
| *C03C 3/083* | (2006.01) |
| *B05D 5/06* | (2006.01) |
| *C03C 3/087* | (2006.01) |
| *G02B 1/11* | (2015.01) |
| *G02B 1/18* | (2015.01) |
| *B05D 1/02* | (2006.01) |
| *B05D 3/02* | (2006.01) |
| *C03C 15/00* | (2006.01) |
| *C03C 3/085* | (2006.01) |
| *C03C 17/23* | (2006.01) |
| *C03C 19/00* | (2006.01) |
| *C03B 23/02* | (2006.01) |

(52) U.S. Cl.
CPC .............. *C03B 23/02* (2013.01); *C03C 3/083* (2013.01); *C03C 3/085* (2013.01); *C03C 3/087* (2013.01); *C03C 15/00* (2013.01); *C03C 17/02* (2013.01); *C03C 17/23* (2013.01); *C03C 19/00* (2013.01); *C03C 21/00* (2013.01); *C03C 21/002* (2013.01); *G02B 1/11* (2013.01); *G02B 1/18* (2015.01); *C03C 2217/732* (2013.01); *C03C 2218/112* (2013.01)

(58) Field of Classification Search
CPC ............. Y10T 428/131; Y10T 428/239; Y10T 428/252; Y10T 428/315; C03C 3/00; C03C 3/068; C03C 3/083; C03C 3/085; C03C 3/087; C03C 3/091; C03C 3/093; C03C 3/095; C03C 3/01; C03C 3/145; C03C 4/02; C03C 4/18; C03C 8/24; C03C 15/00; C03C 17/02; C03C 17/23; C03C 17/34; C03C 19/00; C03C 21/00; C03C 21/002; C03C 2204/00; C03C 27/06; C03C 2217/73; C03C 2217/732; C03C 2217/77; C03C 2218/112; C23C 14/10
USPC ....... 359/599, 580, 581, 582; 428/34.4, 410, 428/426, 325, 331, 76, 64.1, 215; 65/43, 65/60.1, 60.5, 60.53, 66; 501/69; 257/40; 106/285; 136/244; 345/60
See application file for complete search history.

(56) References Cited

U.S. PATENT DOCUMENTS

| | | | | |
|---|---|---|---|---|
| 2004/0003890 | A1* | 1/2004 | Bauer | B27D 1/00 |
| | | | | 156/285 |
| 2007/0166536 | A1 | 7/2007 | Dollase et al. | |
| 2008/0095997 | A1* | 4/2008 | Chiang | G02B 1/16 |
| | | | | 428/215 |
| 2009/0153974 | A1* | 6/2009 | Sales | G02B 3/02 |
| | | | | 359/621 |
| 2011/0274916 | A1 | 11/2011 | Murata | |
| 2012/0202030 | A1* | 8/2012 | Kondo | B32B 17/06 |
| | | | | 428/215 |
| 2012/0231184 | A1 | 9/2012 | Hanada et al. | |
| 2012/0288661 | A1 | 11/2012 | Wei | |
| 2013/0040133 | A1 | 2/2013 | Sonoda et al. | |
| 2013/0164483 | A1 | 6/2013 | Cites et al. | |
| 2013/0323444 | A1 | 12/2013 | Ehemann et al. | |
| 2014/0057117 | A1* | 2/2014 | Suzuki | C08J 5/18 |
| | | | | 428/423.1 |
| 2014/0144182 | A1 | 5/2014 | Dannoux et al. | |
| 2014/0154661 | A1 | 6/2014 | Bookbinder et al. | |
| 2014/0230492 | A1 | 8/2014 | Murata | |
| 2015/0175473 | A1 | 6/2015 | Yamamoto et al. | |
| 2017/0059749 | A1 | 3/2017 | Wakatsuki et al. | |

FOREIGN PATENT DOCUMENTS

| | | |
|---|---|---|
| JP | 62-57285 U | 4/1987 |
| JP | 7-287218 A | 10/1995 |
| JP | 2004-145674 A | 5/2004 |
| JP | 2005-096322 A | 4/2005 |
| JP | 2005-306660 | 11/2005 |
| JP | 2008-247700 A | 10/2008 |
| JP | 2011-47977 A | 3/2011 |
| JP | 2011-245705 A | 12/2011 |
| JP | 2012-20921 A | 2/2012 |
| JP | 2012-101975 A | 5/2012 |
| JP | 2012-233157 A | 11/2012 |
| JP | 2013-040089 A | 2/2013 |
| JP | 2013-120159 A | 6/2013 |
| JP | 2013-139381 | 7/2013 |
| JP | 2013-189007 A | 9/2013 |
| JP | 2013-536795 | 9/2013 |
| JP | 2013-256104 A | 12/2013 |
| JP | 2014-10294 A | 1/2014 |
| TW | 201219322 A | 5/2012 |
| TW | 201402477 A | 1/2014 |
| TW | 201408617 A | 3/2014 |
| WO | WO 97/22036 A1 | 6/1997 |
| WO | WO 2010/084670 A1 | 7/2010 |
| WO | WO 2013/078039 A1 | 5/2013 |
| WO | WO 2013/172461 A1 | 11/2013 |
| WO | WO 2013/181208 A2 | 12/2013 |
| WO | WO 2013/184904 A1 | 12/2013 |
| WO | WO 2014/010533 A1 | 1/2014 |
| WO | WO 2014/042175 A1 | 3/2014 |

OTHER PUBLICATIONS

International Search Report dated Aug. 11, 2015 in PCT/JP2015/063686, filed on May 12, 2015 (with English Translation).

Written Opinion dated Aug. 11, 2015 in PCT/JP2015/063686, filed on May 12, 2015.

Chinese Office Action dated Apr. 25, 2022, in Chinese Patent Application No. 201580025277.2 (with Partial English Translation thereof).

* cited by examiner

[FIG. 1]
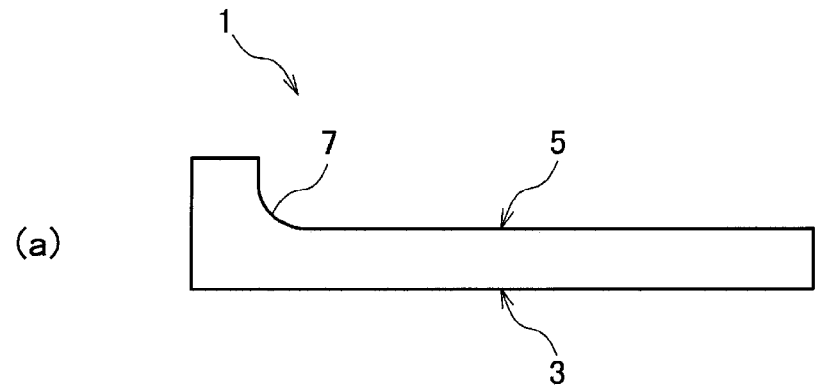
(a)
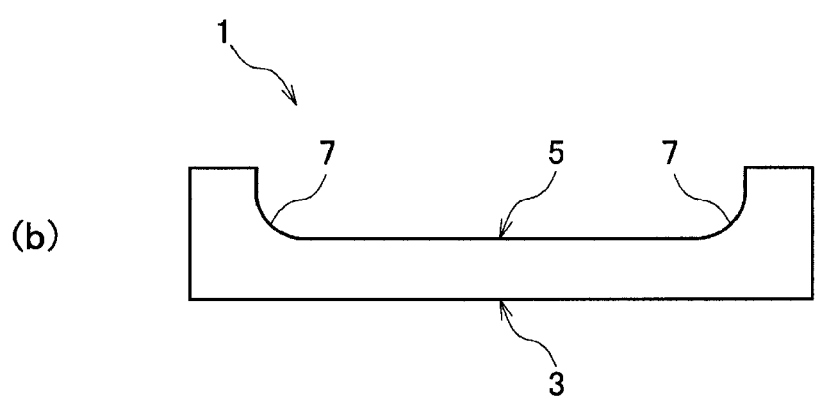
(b)
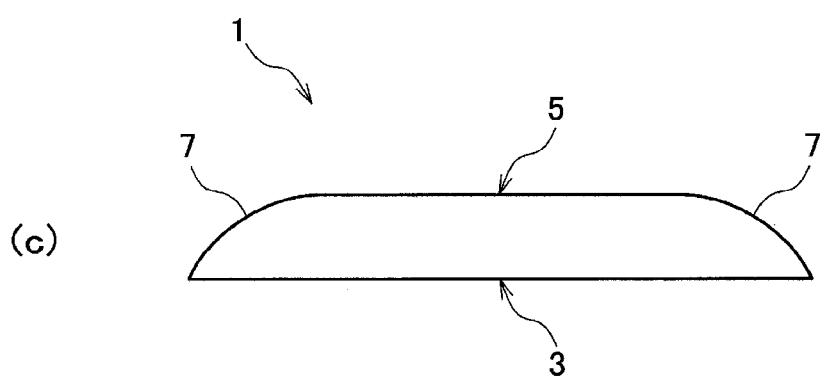
(c)

[FIG. 2]
(a) 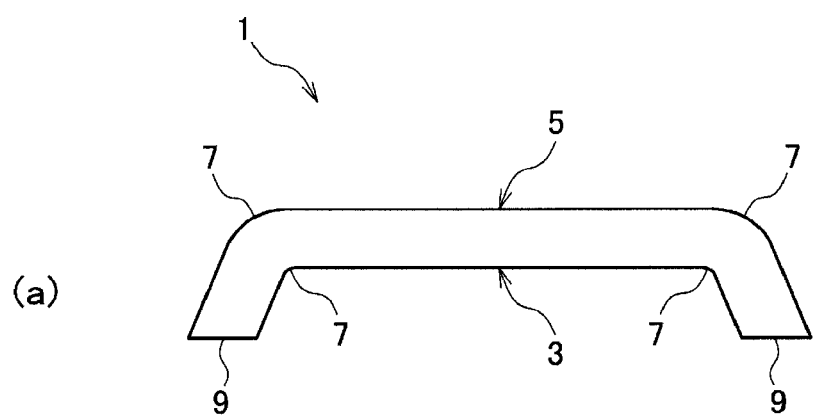
(b) 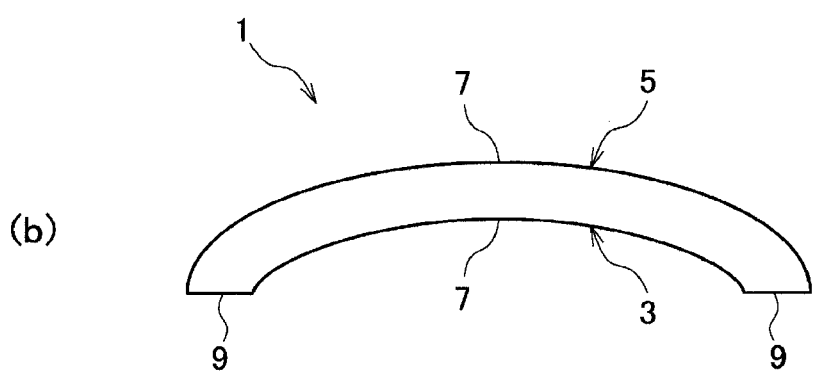

[FIG. 3]
(a)
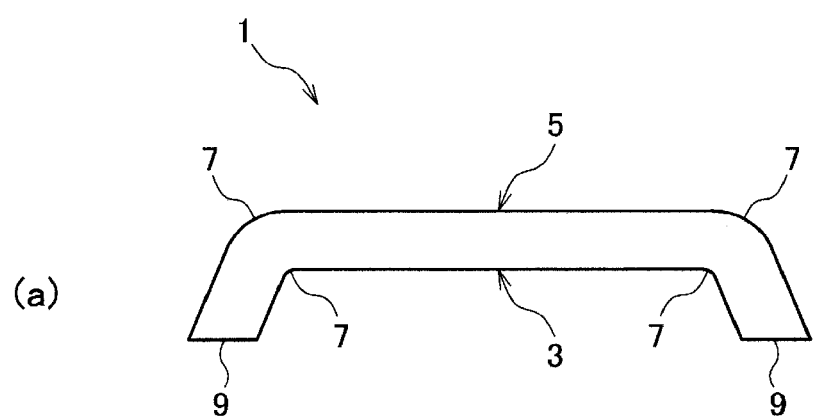
(b)
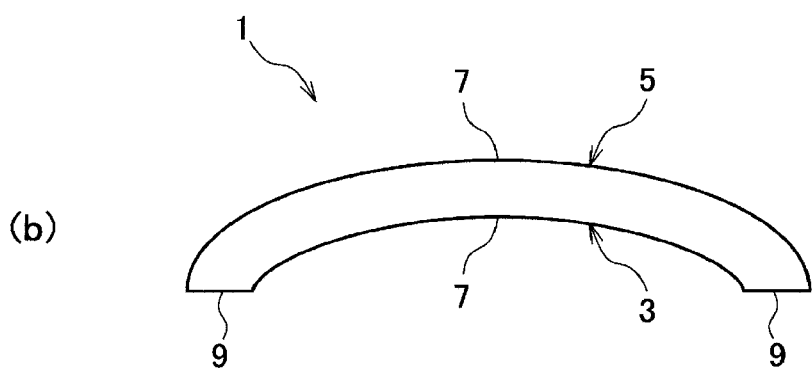

[FIG. 4]
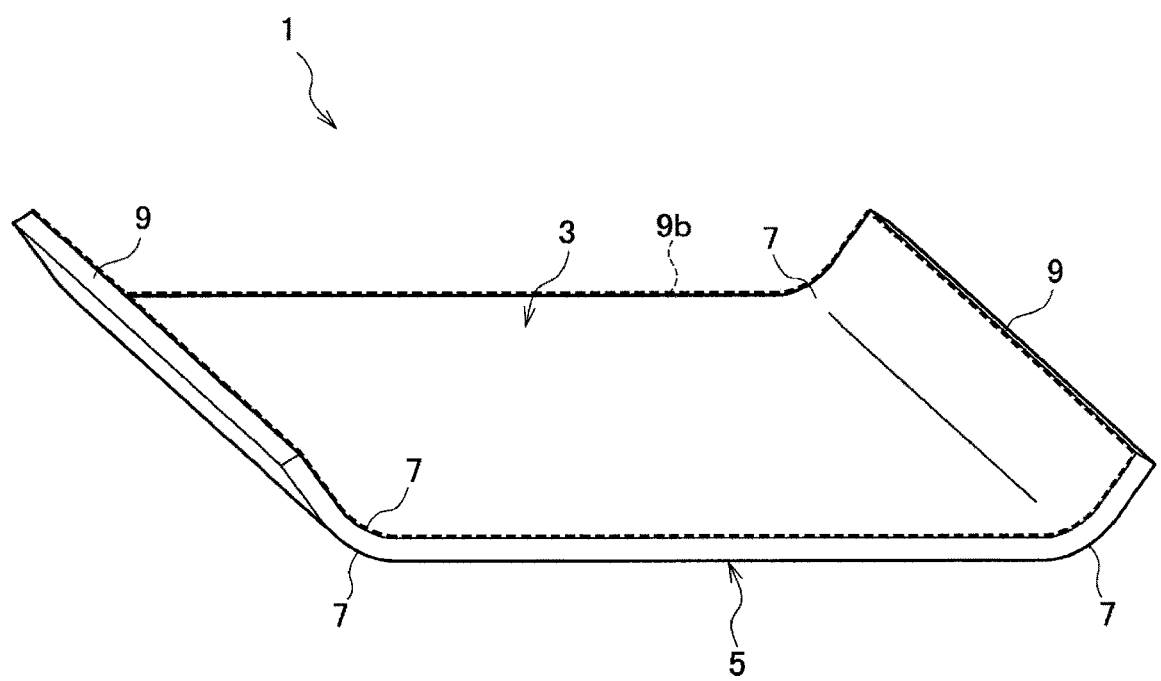

[FIG. 5]
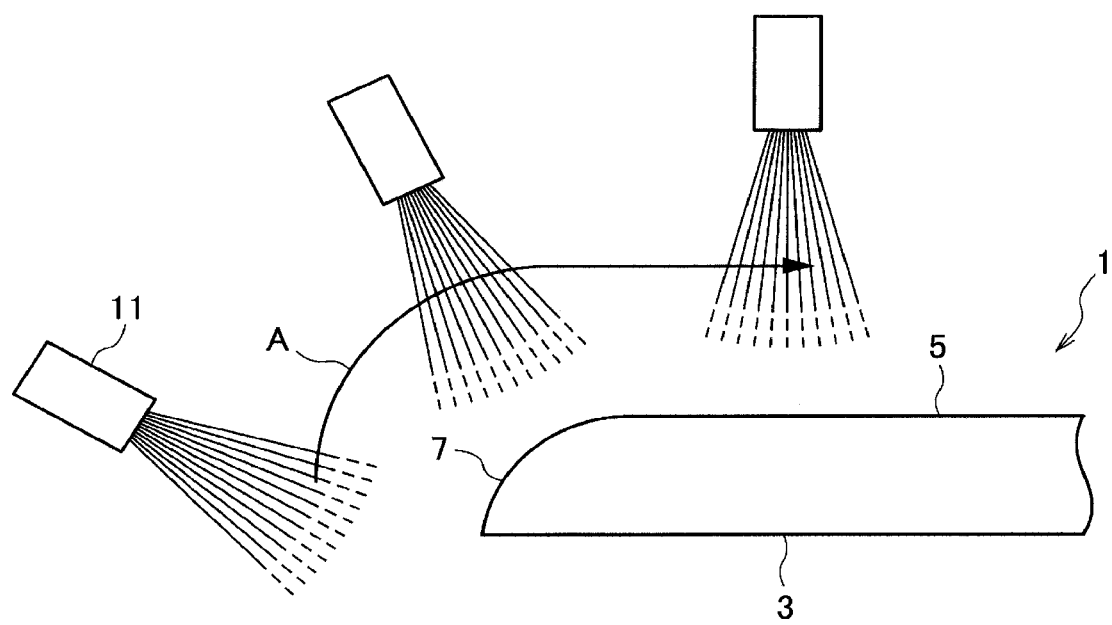

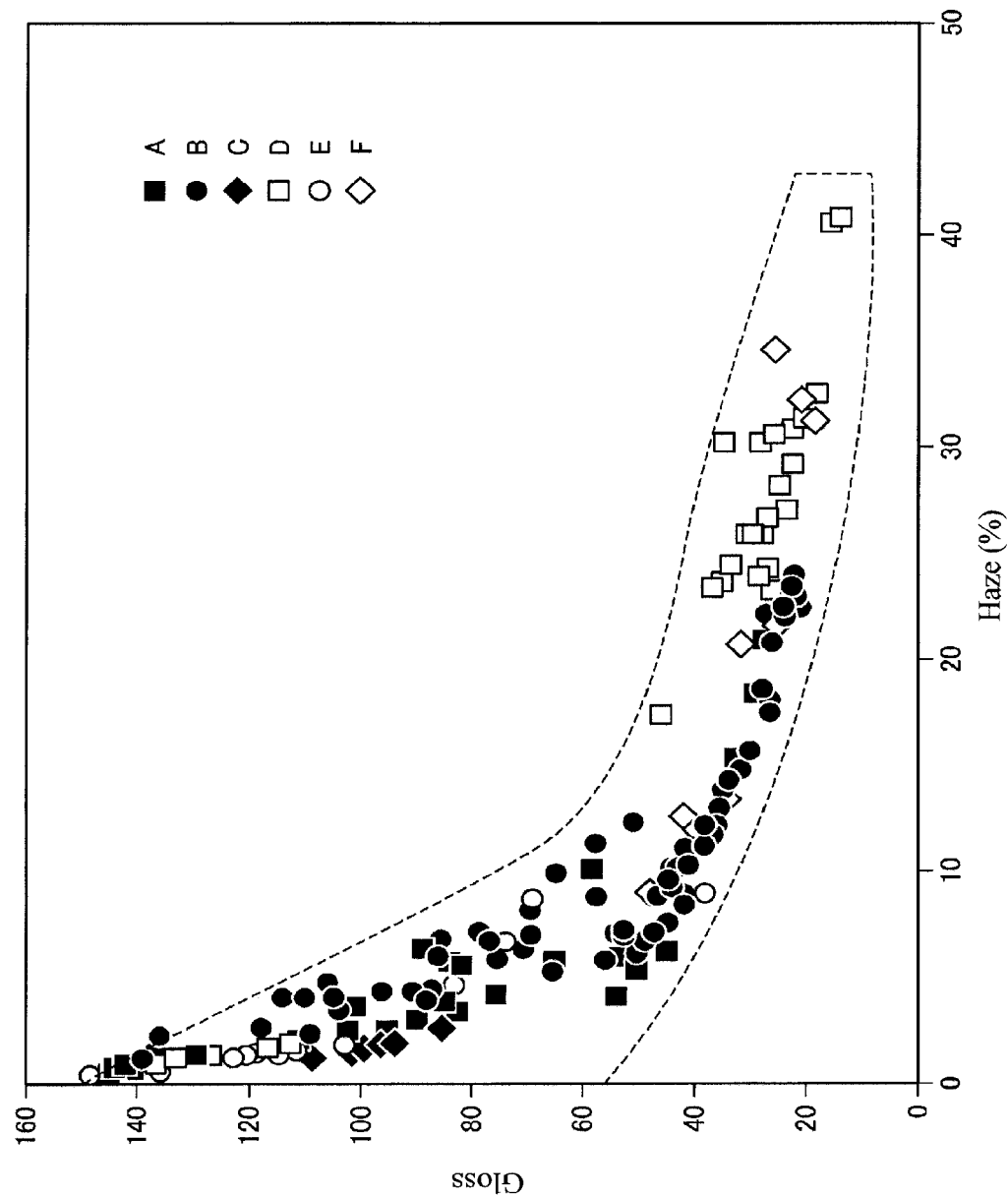
[FIG. 6]

[FIG. 7]
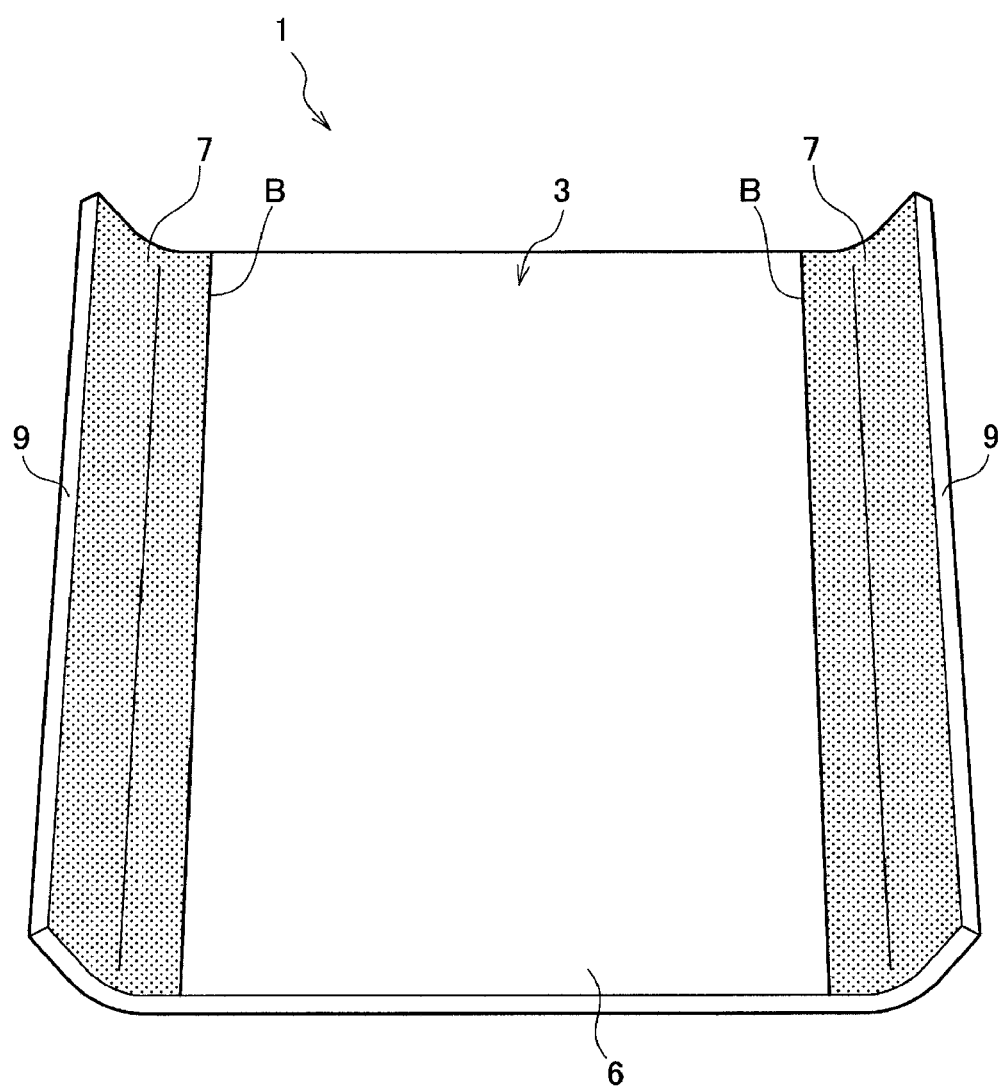

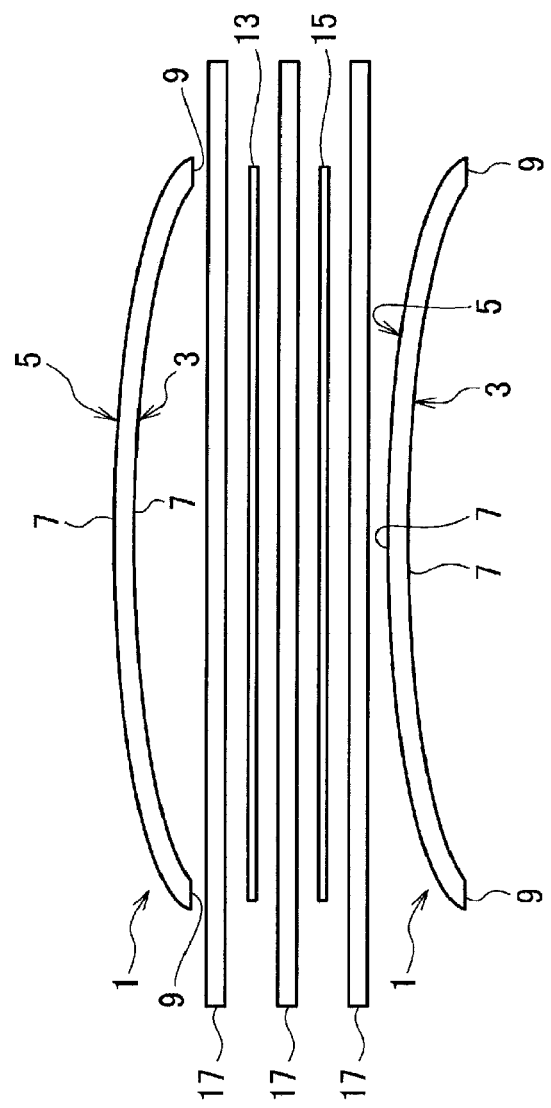
[FIG. 8]

[FIG. 9]
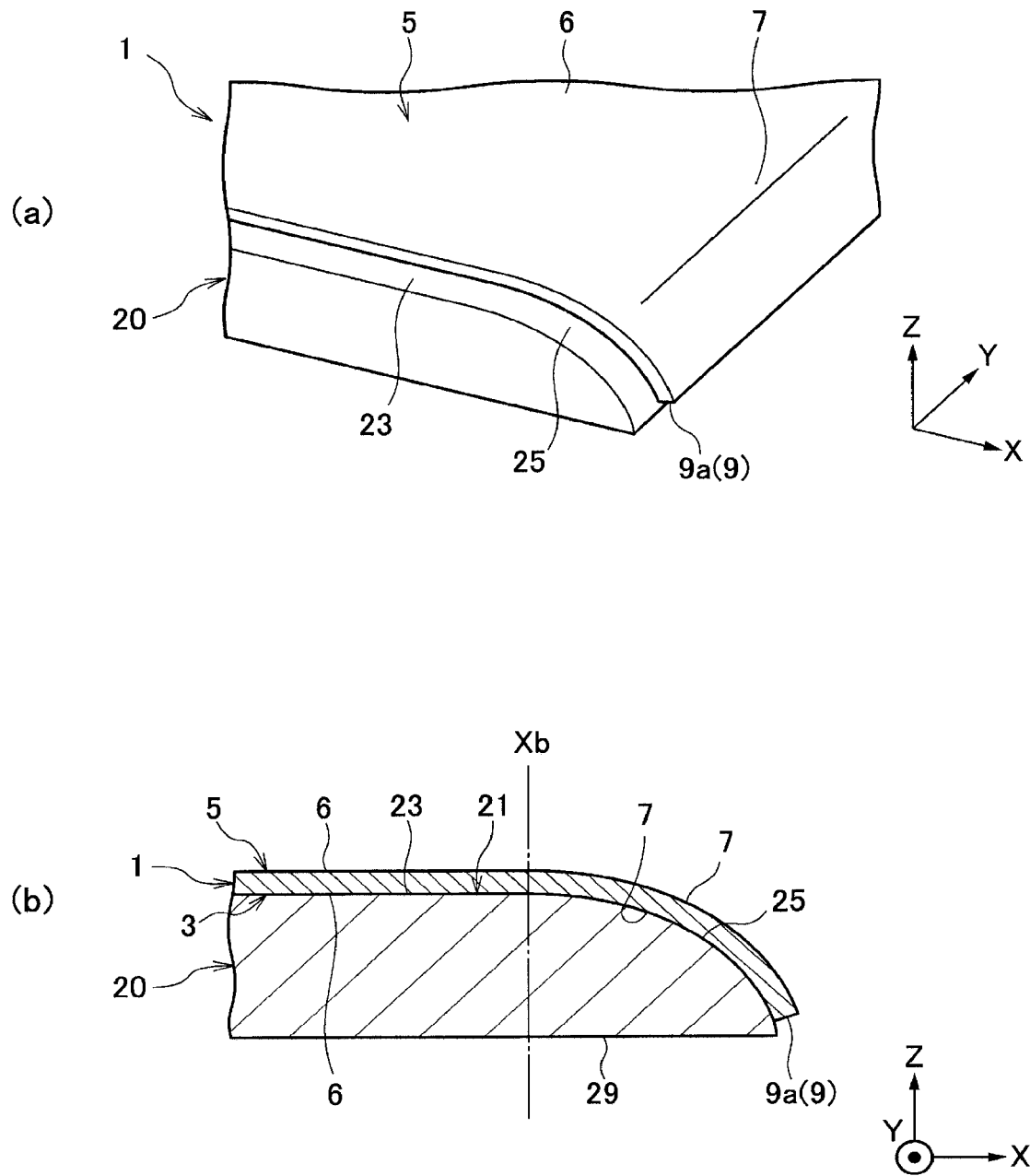

[FIG. 10]
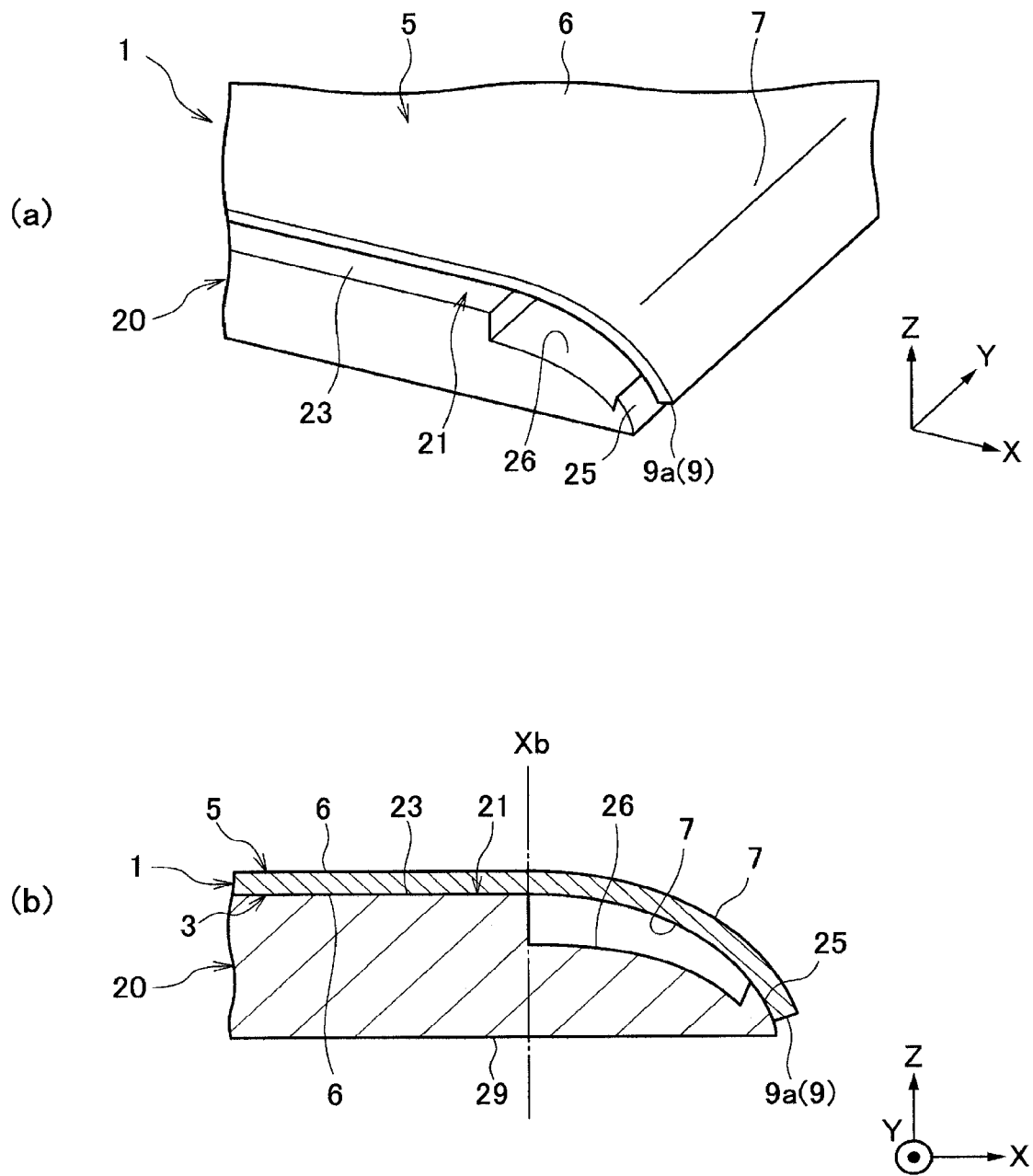

[FIG. 11]
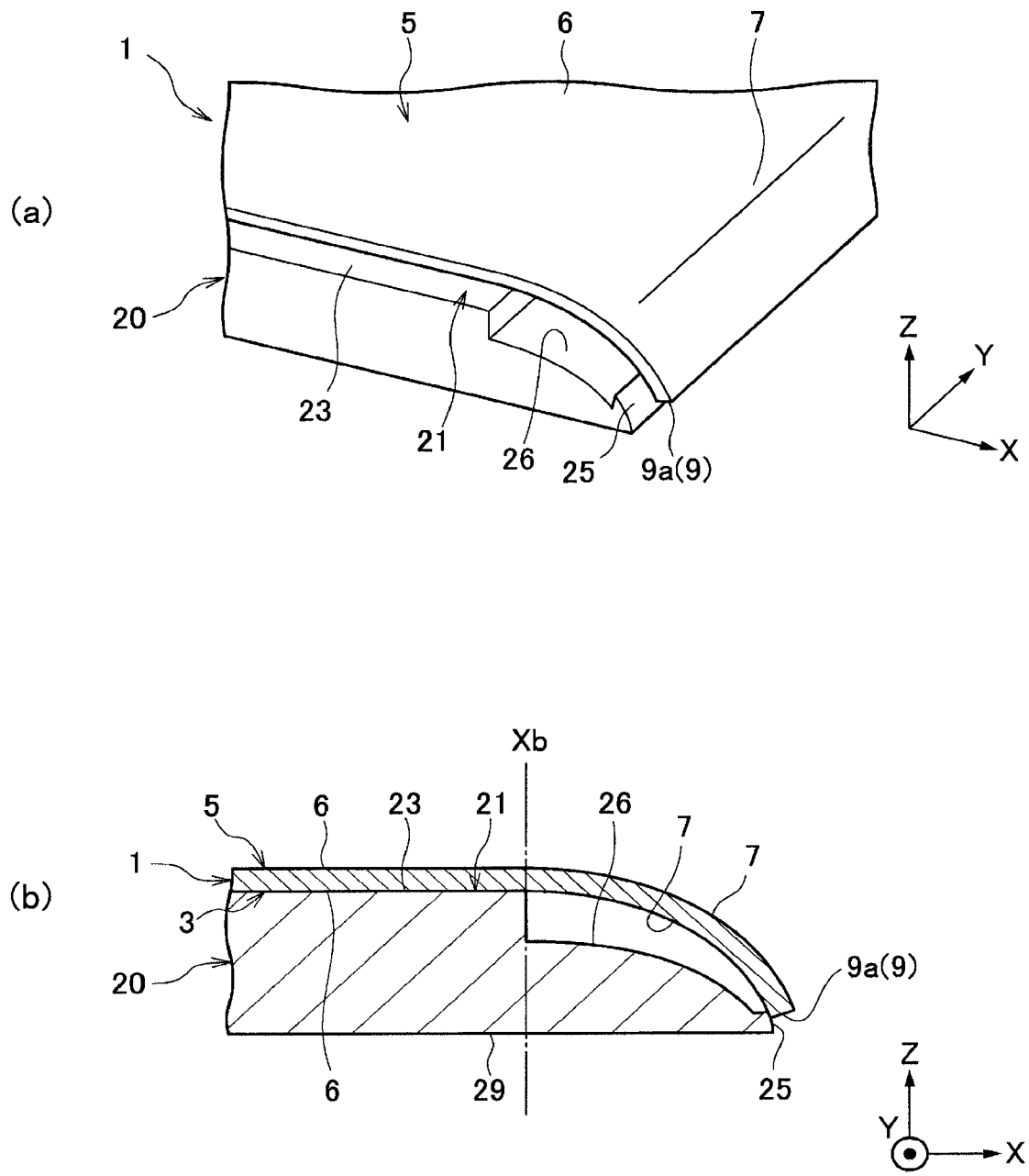

[FIG. 12]
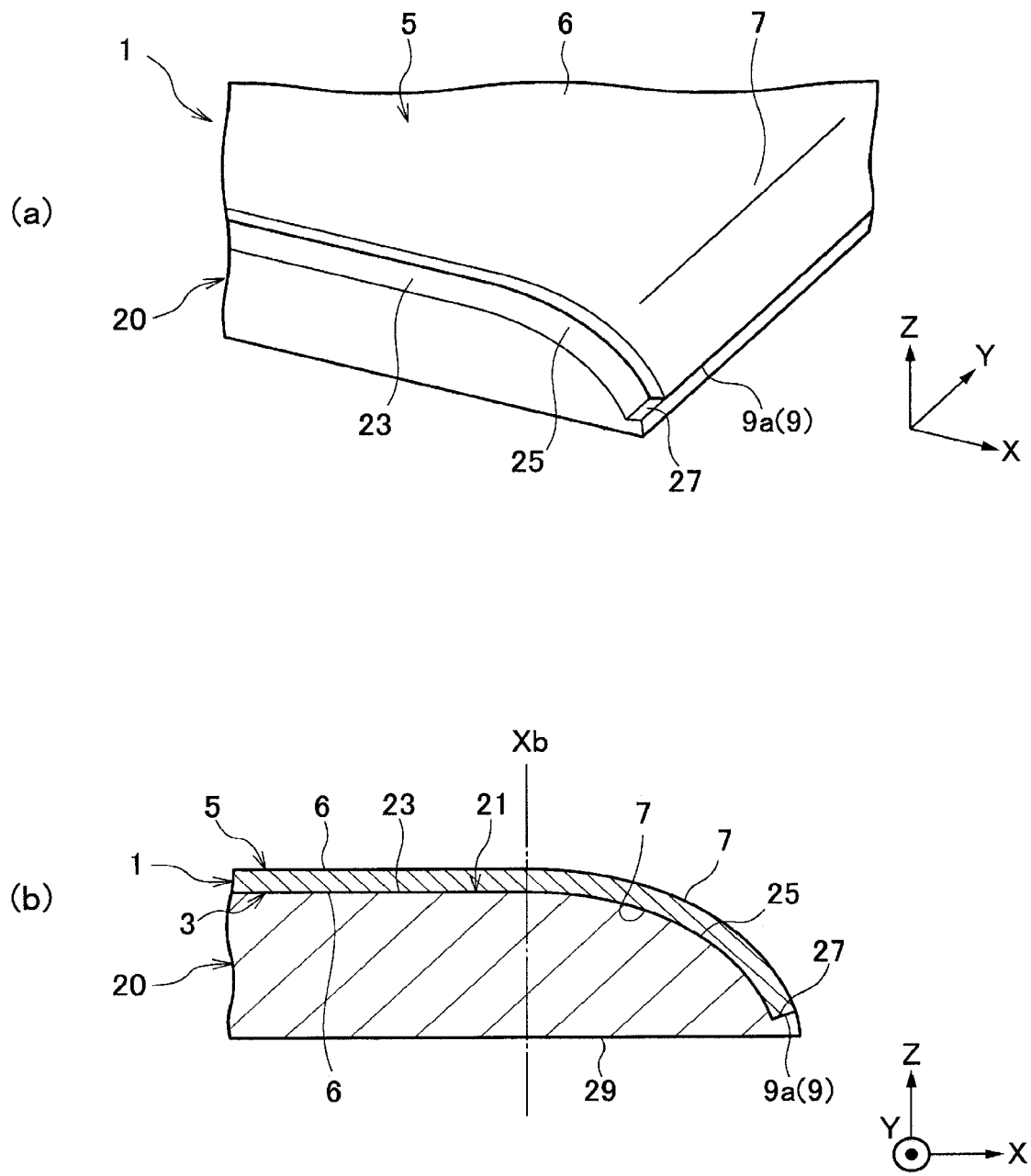

[FIG. 13]
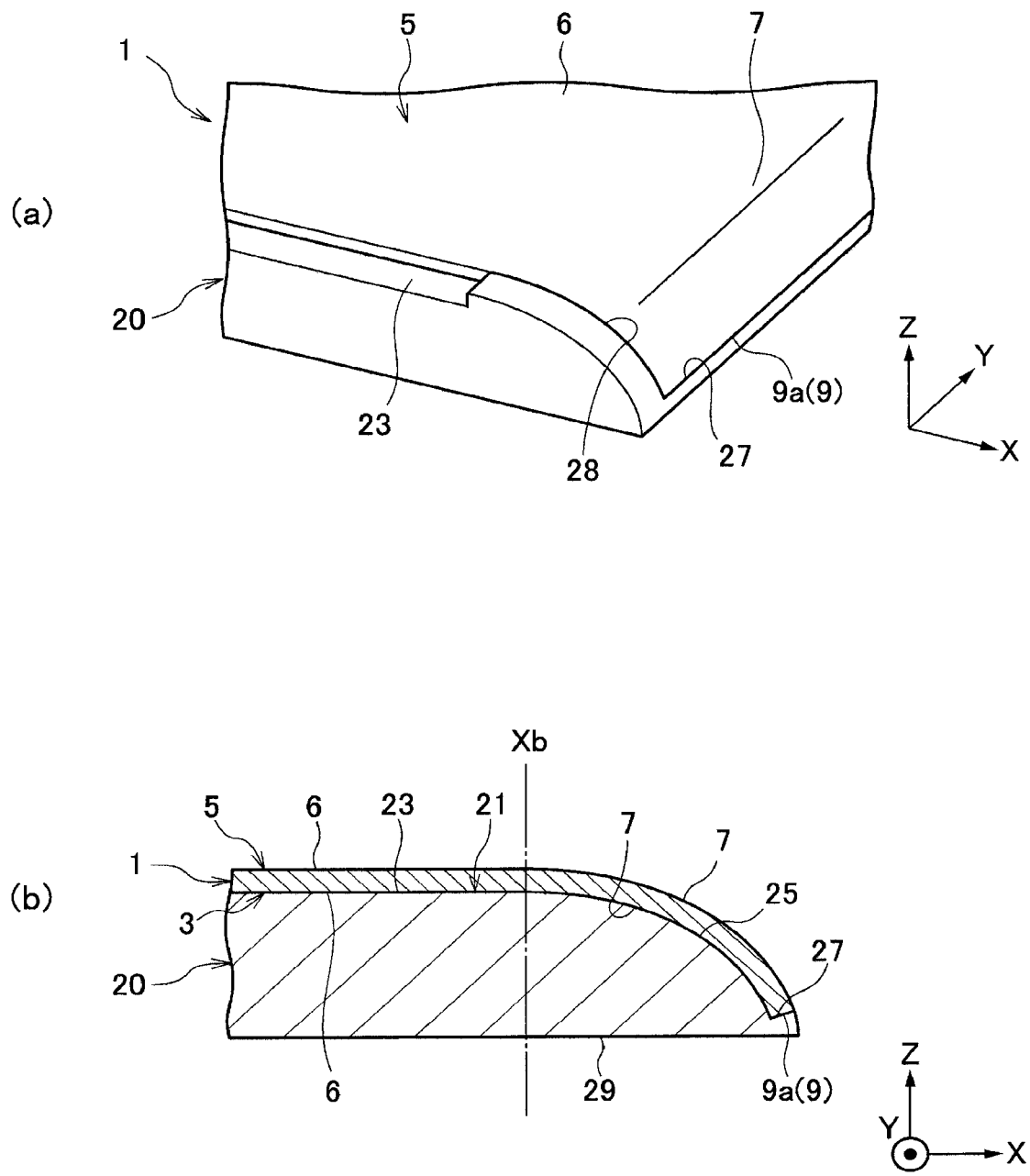

[FIG. 14]
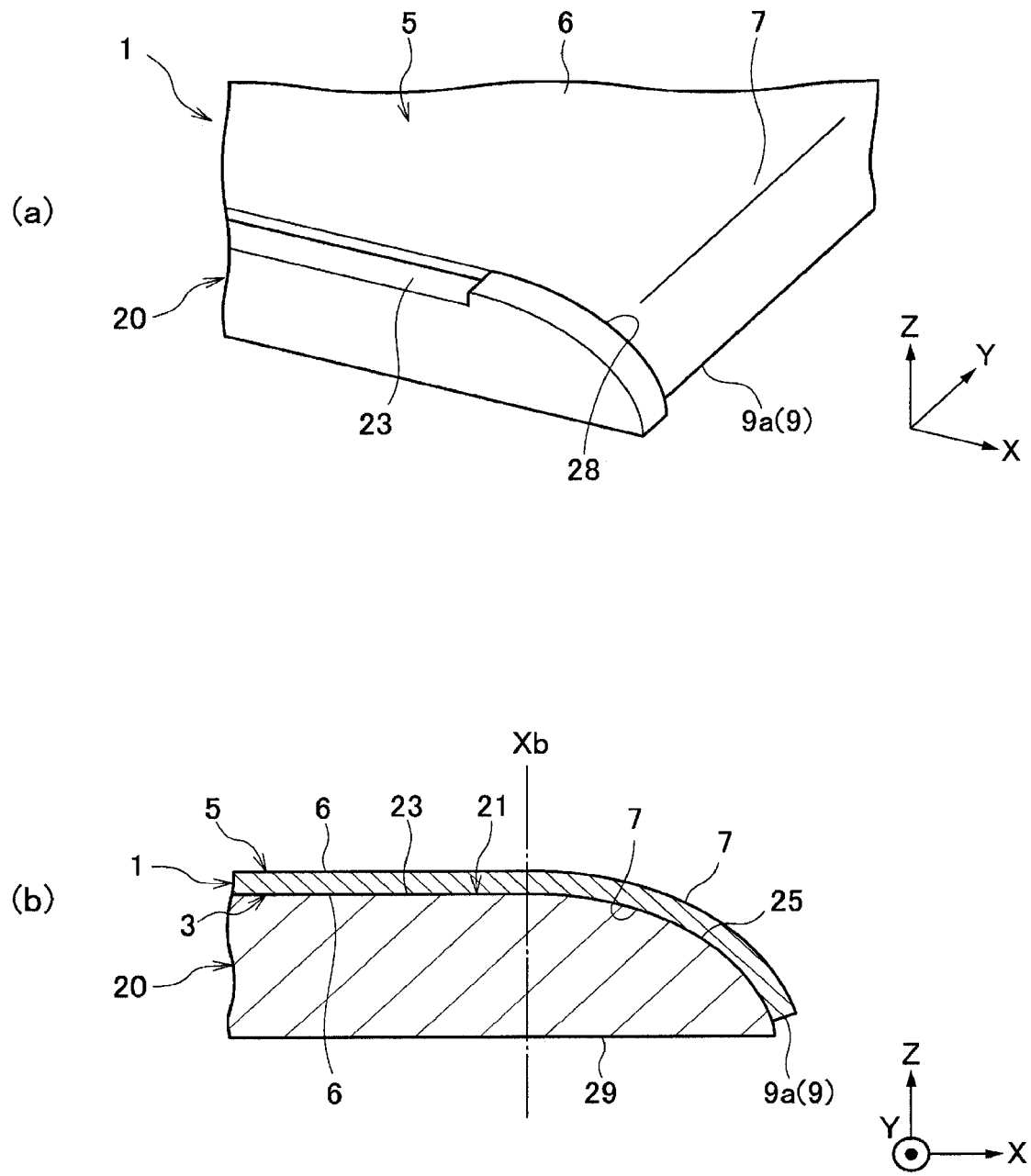

[FIG. 15]
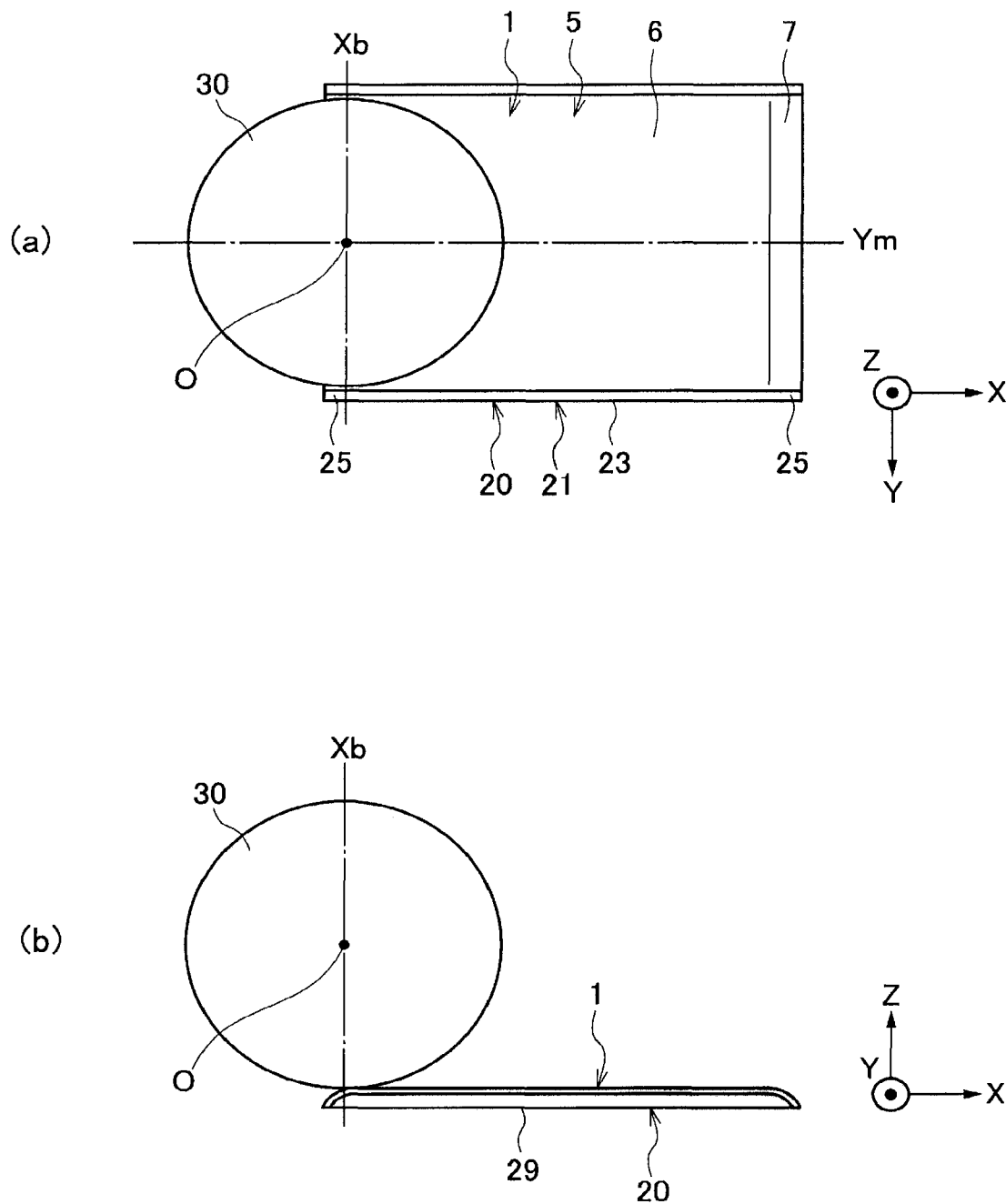

[FIG. 16]
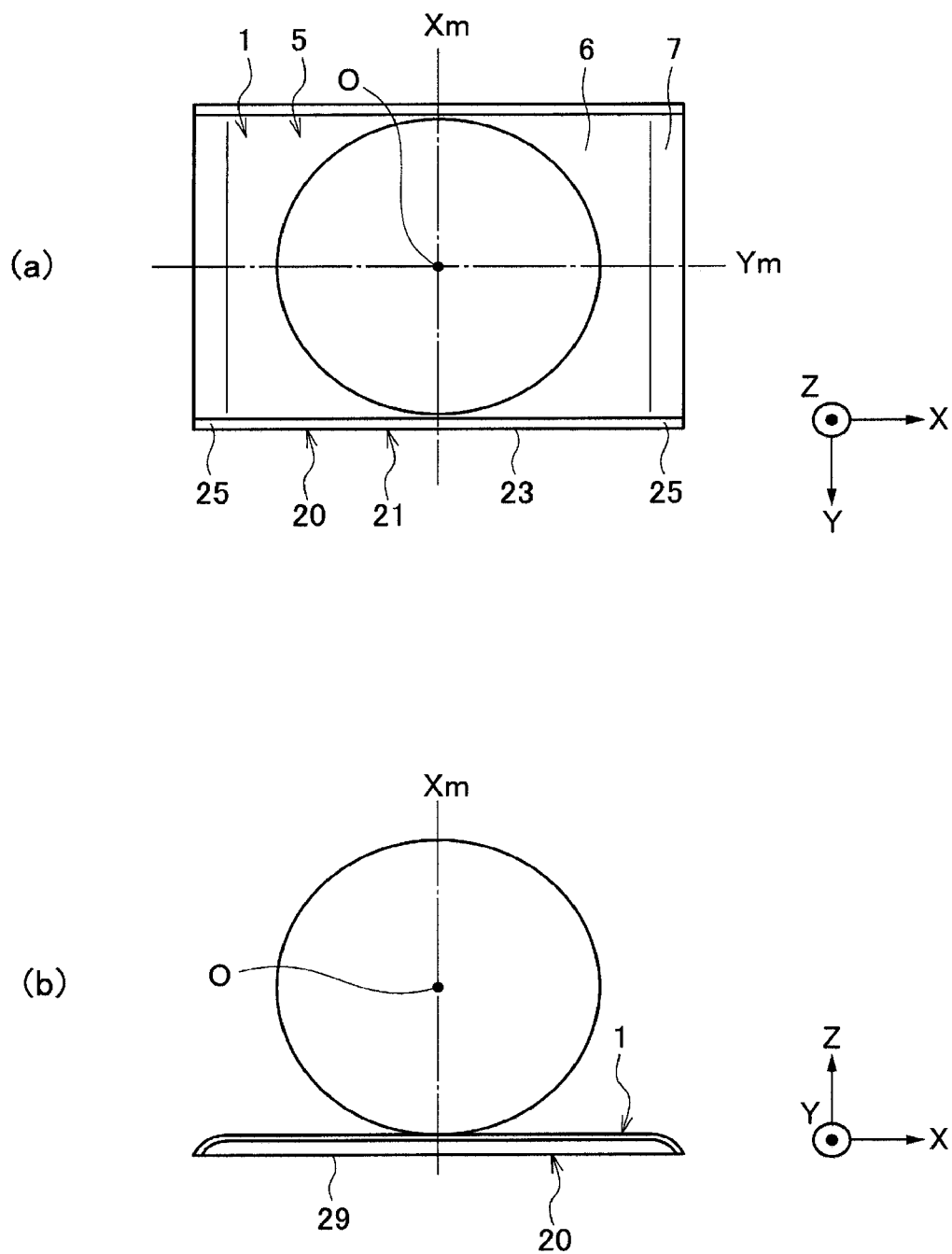

[FIG. 17]
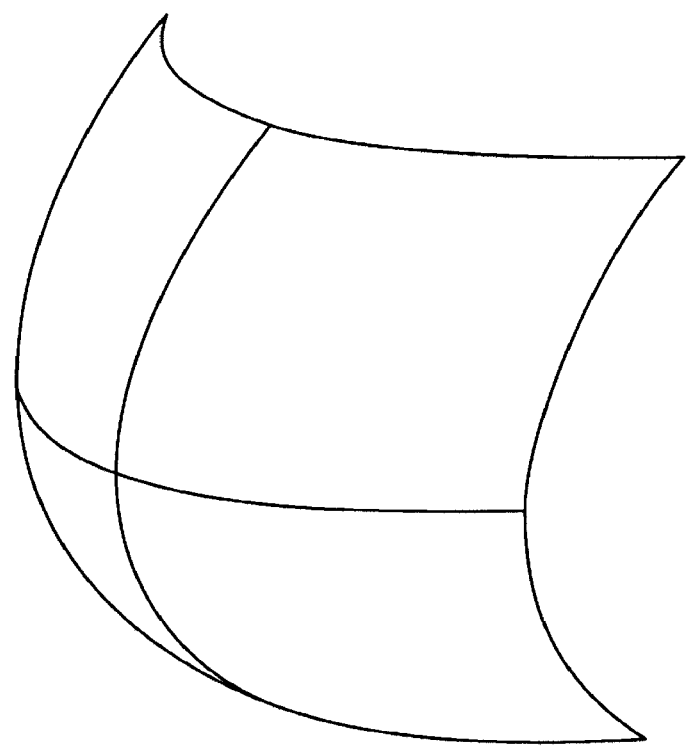

[FIG. 18]
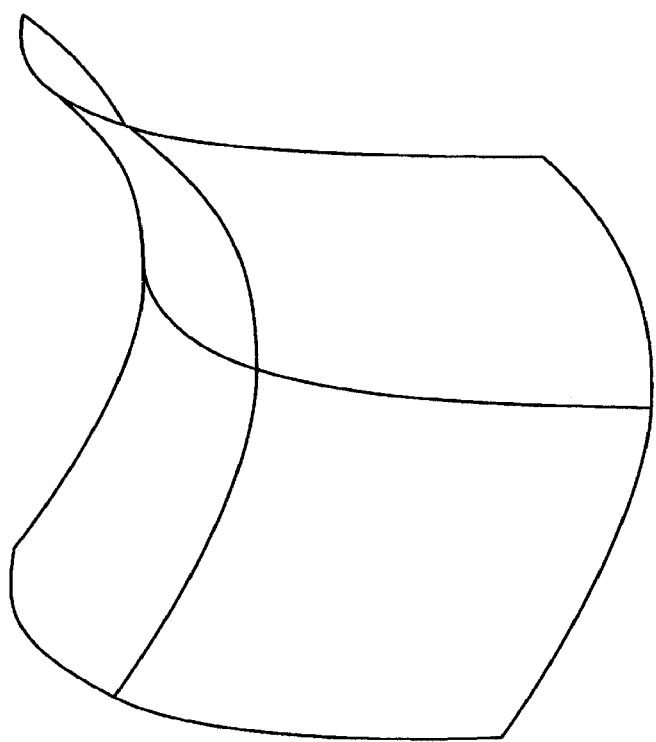

[FIG. 19]
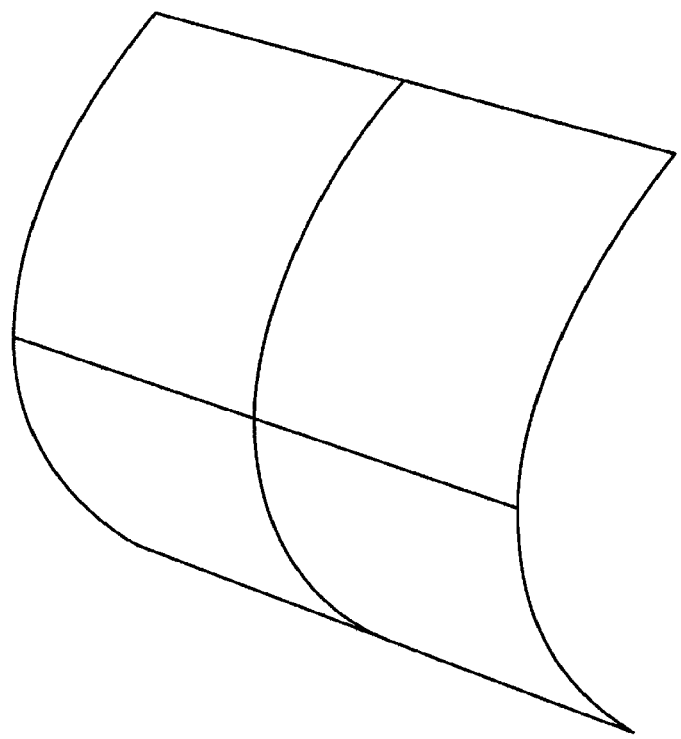

[FIG. 20]
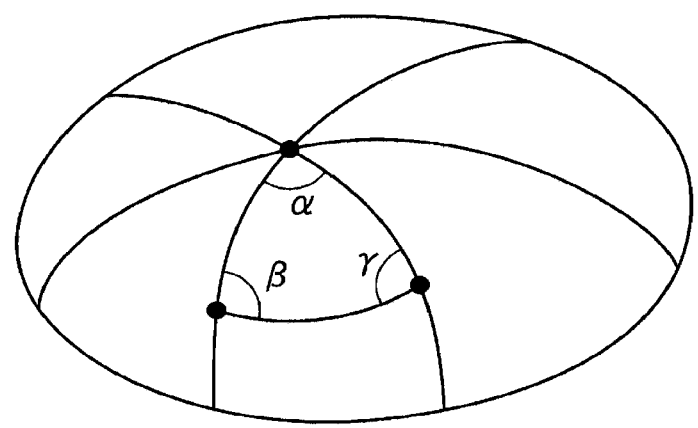
$\alpha + \beta + \gamma > 180°$

[FIG. 21]
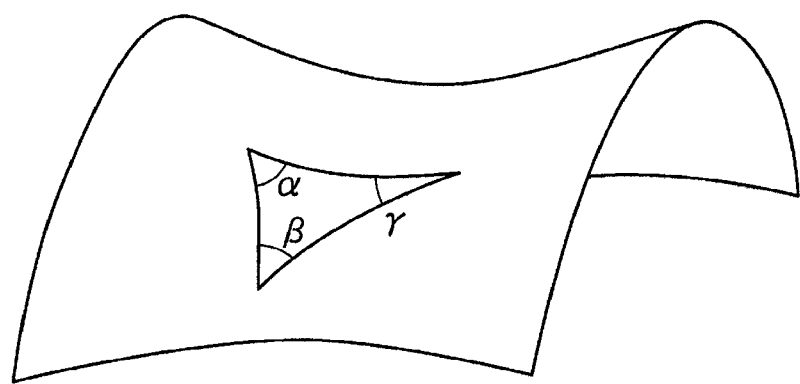
$\alpha + \beta + \gamma < 180°$

GLASS ARTICLE AND PRODUCTION METHOD FOR GLASS ARTICLE

TECHNICAL FIELD

The present invention relates to a glass article and a method for producing a glass article.

BACKGROUND ART

In recent years, in transportation devices such as automobiles, trains, ships, and aircrafts, for the purpose of protecting an interior member and enhancing its appearance, a thin sheet-like cover glass is arranged on the front surface of the interior member in some cases. Examples of the interior members of the transportation devices include instrument panels, head-up displays (HUD), dashboards, center consoles, shift knobs, and the like.

The cover glass to be used in such an interior member of a transportation device has been required to possess various advantageous properties as compared with the cover glass for usual use applications, i.e., the cover glass to be used in mobile phones, personal computers, televisions, or the like.

For example, the cover glass to be mounted on a transportation device is strongly desired to achieve unity with a design effectively using a space or a design pursuing comfortability in order to realize a high designability, a luxurious feel, and followability to interior design of the transportation device. However, it is difficult to realize such properties required for the cover glass for the interior member by a conventionally known planar glass or a simple three-dimensionally shaped glass.

Incidentally, Patent Document 1 discloses that, in a cover glass for mobile electronic devices having a three-dimensional shape, surface roughness of the glass surface is made smaller than a predetermined value.

PRIOR ART DOCUMENT

Patent Document

Patent Document 1: WO2013/181208

SUMMARY OF THE INVENTION

Problems that the Invention is to Solve

In addition, the cover glass for an interior member should satisfy various requirements such as environment-resistant properties, that is, high reliability even under severe temperature conditions of about −30° C. to +85° C., high luminance, wide viewing angle, antiglare properties, antireflection properties, and antifouling properties (antifingerprint properties).

However, the cover glass of Patent Document 1 is invented on the premise of mobile use applications and is not suitable for interior members of transport devices, for example.

The present invention is made in consideration of the above problems and an object thereof is to provide a three-dimensionally shaped glass capable of being used in various use applications.

Means for Solving the Problems

The above object of the invention is achieved by the following configurations.

(1) A glass article having a three-dimensional shape, having a first surface and at least one second surface opposite to the first surface, and having a bent part in at least one place of the first surface or the second surface.

(2) The glass article according to (1), in which the first surface and the second surface each have a bent part in at least one place thereof.

(3) The glass article according to (1) or (2), further having at least one edge surface connecting the first surface and the second surface,
in which the edge surface has an outline of a three-dimensional curve.

(4) The glass article according to any one of (1) to (3), in which the bent part contains at least one site having an average radius of curvature of 30 cm or less.

(5) The glass article according to any one of (1) to (4), in which the bent part contains at least one site having a Gaussian curvature of not 0.

(6) The glass article according to (5), in which the Gaussian curvature is negative.

(7) The glass article according to any one of (1) to (6), which is mounted on a transportation device.

(8) The glass article according to (7), which is used for an interior member of the transportation device.

(9) The glass article according to any one of (1) to (8), in which at least a part of the first surface or the second surface of the glass article is supported by a support member.

(10) The glass article according to (9), in which at least one place of the bent part is supported by the support member facing the bent part.

(11) The glass article according to (9) or (10), in which the support member supports the bent part so that the bent part is movable.

(12) The glass article according to any one of (9) to (11), in which the edge surface connecting the first surface and the second surface is composed of a bent part edge surface connecting the bent part of the first surface and the bent part of the second surface and
the bend part edge surface does not come into contact with the support member.

(13) The glass article according to any one of (9) to (12), in which the support member has a Young's modulus of from 0.02 to 1.5 times the Young's modulus of the glass article.

(14) The glass article according to any one of (1) to (13), in which at least one of the first surface and the second surface of the glass article has been subjected to an etching treatment with hydrofluoric acid.

(15) The glass article according to any one of (1) to (13), further containing an antiglare film provided on at least one of the first surface and the second surface of the glass article.

(16) The glass article according to any one of (14) to (15), in which at least one of the first surface and the second surface of the glass article has a gloss value of from 20 to 30.

(17) The glass article according to any one of (14) to (16), in which at least one of the first surface and the second surface of the glass article has a haze value of 40% or less.

(18) A method for producing a glass article, containing forming the antiglare film by performing spray coating with a coating liquid having antiglare properties, in the glass article described in any one of (15) to (17).

(19) The method for producing a glass article according to (18), in which the coating liquid contains $SiO_2$ or a $SiO_2$ precursor.

(20) The method for producing a glass article according to (18) or (19), in which the antiglare film is formed by burning after the spray coating is performed.

(21) The method for producing a glass article according to (20), in which the burning is performed by a thermal treatment at the time of chemical strengthening of the glass article.

(22) The glass article according to any one of (1) to (17), further containing a low reflection film provided on at least one surface of the glass article.

(23) The glass article according to (22), in which the low reflection film contains a film composed of a material having a high refractive index and a film composed of a material having a low refractive index stacking alternately.

(24) The glass article according to any one of (1) to (17) and (22) to (23), further containing an antifouling film provided on at least one surface of the glass article.

(25) The glass article according to any one of (1) to (17) and (22) to (24), in which at least one surface of the glass article has a coefficient of static friction of 1.0 or less.

(26) The glass article according to any one of (1) to (17) and (22) to (25), in which at least one surface of the glass article has a coefficient of dynamic friction of 0.02 or less.

(27) The glass article according to any one of (1) to (17) and (22) to (26), having an arbitrary pattern printed on at least one surface of the glass article.

(28) The glass article according to (27), in which the pattern on the bent part is printed by a pad printing method.

(29) The glass article according to (27) or (28), in which at least one surface of the glass article has a planar part connecting to the bent part,
the bent part is printed by a pad printing method, and
the planar part is printed by a screen printing method.

(30) The glass article according to (27), in which the pattern on the bent part is printed by a spray printing method.

(31) The glass article according to (30), in which at least one surface of the glass article has a planar part connecting to the bent part and the bent part and the planar part are both printed by a spray printing method.

(32) The glass article according to any one of (1) to (17) and (22) to (31), in which the glass article has a total content of $Li_2O$ and $Na_2O$ of 12 mol % or more.

(33) The glass article according to (32), in which the glass article contains 0.5 mol % or more of $Li_2O$.

(34) The glass article according to (32), in which the glass article contains 60 mol % or more of $SiO_2$ and 8 mol % or more of $Al_2O_3$.

(35) The glass article according to any one of (1) to (17) and (22) to (34), being chemically strengthened.

(36) The glass article according to any one of (1) to (17) and (22) to (35), further containing a resin film disposed on at least one surface of the glass article.

(37) A laminated glass article containing laminated one pair of the glass articles described in any one of (1) to (17) and (22) to (36).

(38) The laminated glass article according to (37), further containing at least one sheet of a film having an optical function or an antiscattering function disposed between one pair of the glass articles, and containing a synthetic resin film having adhesiveness disposed between the film and the glass article and between the films.

(39) A method for producing a laminated glass article containing heating the glass article described in any one of (1) to (17) and (22) to (36), at least one sheet of a film having an optical function or an antiscattering function disposed between one pair of the glass articles, and a synthetic resin film having adhesiveness disposed between the films to a predetermined temperature and subsequently pressurizing and crimping them,
in which the film has a shape that matches to the shape of the glass article before pressurizing and crimping.

Advantageous Effect of the Invention

The glass article of the present invention is a glass article having a three-dimensional shape, having a first surface and at least one second surface opposite to the first surface and having a bent part in at least one place of the first surface and the second surface. Therefore, it is suitable for interior members of transportation devices, for example. Furthermore, the glass article of the present invention provides a glass article having an unknown attribute for various use applications that cannot be realized by any conventional glass.

BRIEF DESCRIPTION OF DRAWINGS

FIG. 1 (a) to (c) are cross-sectional views illustrating glass articles.

FIG. 2 (a) to (b) are cross-sectional views illustrating glass articles.

FIG. 3 (a) to (b) are cross-sectional views illustrating glass articles.

FIG. 4 it is a perspective view of the glass article of FIG. 2(a).

FIG. 5 it is a diagram illustrating a step of performing spray coating with a coating liquid onto a glass article.

FIG. 6 it is a diagram showing a relationship between haze values and gloss values of glass surfaces in the case of performing spray coating with a coating liquid.

FIG. 7 it is a perspective view illustrating a glass article on which a pattern is printed.

FIG. 8 it is a cross-sectional view illustrating a laminated glass article.

FIG. 9 (a) is a perspective view illustrating a state that a glass article is supported by a support member of a support shape 1 and (b) is a cross-sectional view thereof.

FIG. 10 (a) is a perspective view illustrating a state that a glass article is supported by a support member of a support shape 2 and (b) is a cross-sectional view thereof.

FIG. 11 (a) is a perspective view illustrating a state that a glass article is supported by a support member of a support shape 2 and (b) is a cross-sectional view thereof.

FIG. 12 (a) is a perspective view illustrating a state that a glass article is supported by a support member of a support shape 3 and (b) is a cross-sectional view thereof.

FIG. 13 (a) is a perspective view illustrating a state that a glass article is supported by a support member of a support shape 4 and (b) is a cross-sectional view thereof.

FIG. 14 (a) is a perspective view illustrating a state that a glass article is supported by a support member of a support shape 5 and (b) is a cross-sectional view thereof.

FIG. 15 (a) is a plan view for explaining a bent part strength test and (b) is a side view thereof.

FIG. 16 (a) is a plan view for explaining a planar part strength test and (b) is a side view thereof.

FIG. 17 it is a perspective view of a curved surface where Gaussian curvature is positive.

FIG. 18 it is a perspective view of a curved surface where Gaussian curvature is negative.

FIG. 19 it is a perspective view of a curved surface where Gaussian curvature is 0.

FIG. 20 it is a perspective view of a spherical surface.

FIG. 21 it is a perspective view of a saddle surface.

MODE FOR CARRYING OUT THE INVENTION (Shape and Use Application)

The glass article of the present embodiment is a glass article having a three-dimensional shape and having a first surface and at least one second surface opposite to the first surface. Moreover, the glass article has a bent part in at least one place of the first surface and the second surface. Here, a simple designation as a "surface" refers to either the first surface or the second surface. Moreover, the "bent part" means a portion where the surface is bent and average curvature thereof is not zero.

Such a glass article can be used in various use applications and, in particular, can be mounted on transportation devices such as automobiles, trains, ships, and aircraft and be suitably used. When it is used for interior members of the transportation devices, such as instrument panels, head-up displays (HUD), dashboards, center consoles, and shift knobs, a high designability, a luxurious feel and the like can be imparted to the interior members and thus the interior design of the transportation devices can be improved. Incidentally, in the present embodiment, the first surface is also called an inner reverse surface and the second surface is also called an outer front surface. The inner reverse surface means a surface positioned inside an assembly including the glass article. The outer front surface means a surface positioned outside the assembly. In the case where there is no assembly including the glass article, any one surface can be regarded as the inner reverse surface and a surface opposite to the inner reverse surface can be regarded as the outer front surface.

For example, (a) to (c) of FIG. 1 each illustrates glass 1 where the inner reverse surface 3 has a planar shape and at least one place of the outer front surface 5 has a bent part 7.

In the glass 1 of FIG. 1(a), a bent part 7 bending in such a direction (the upward direction in the figure) that it separates from the inner reverse surface 3 as approaching one edge side is provided on one edge part (the left side part in the figure) of the outer front surface 5. In the glass 1 of FIG. 1(b), one pair of bent parts 7 bending in such a direction that they separate from the inner reverse surface 3 as approaching both edge sides are provided on both edge parts of the outer front surface 5. In the glass 1 of FIG. 1(c), bent parts 7 bending in such a direction (the downward direction in the figure) that they come close to the inner reverse surface 3 as approaching both edge sides are provided on both edge parts of the outer front surface 5.

In addition, (a) to (b) of FIG. 2 and (a) to (b) of FIG. 3 each illustrate glass 1 having bent parts 7 in at least one place of the inner reverse surface 3 and of the outer front surface 5 and having edge surfaces 9 that are sandwiched between the inner reverse surface 3 and outer front surface 5 and connect the both.

Also referring to FIG. 4, the glass 1 of FIG. 2(a) has one pair of bent parts 7 on both edge parts of the inner reverse surface 3, which bend in such a direction that they separate from the outer front surface 5 as approaching both edge sides. Furthermore, the glass 1 has another one pair of bent parts 7 on both edge parts of the outer front surface 5, which bend in such a direction that they come close to the inner reverse surface 3 as approaching both edge sides. Here, since the opposing bent part 7 of the inner reverse surface 3 and bent part 7 of the outer front surface 5 have mutually homologizing shapes, that is, mutually almost parallel shapes, the inner reverse surface 3 and the outer front surface 5 are made mutually almost parallel.

In the glass 1 of FIG. 2(b), the whole of the inner reverse surface 3 is formed of a bent part 7 bending in such a direction that it separates from the outer front surface 5 as approaching both edge sides, and the whole of the outer front surface 5 is formed of a bent part 7 bending in such a direction that it comes close to the inner reverse surface 3 as approaching both edge sides. Here, since the opposing bent part 7 of the inner reverse surface 3 and bent part 7 of the outer front surface 5 have mutually homologizing shapes, that is, mutually almost parallel shapes, the inner reverse surface 3 and the outer front surface 5 are made mutually almost parallel.

Each glass 1 of FIG. 3(a) and FIG. 3(b) has the same cross-sectional shapes as those of FIG. 2(a) and FIG. 2(b), respectively. However, the configurations are different in that, in FIG. 2(a) and FIG. 2(b), the bent parts 7 extend toward both sides in a width direction of each glass but, in FIG. 3(a) and FIG. 3(b), the bent parts 7 extend from the center of the glass 1 to peripheral edge parts. Therefore, each glass 1 of FIG. 3(a) and FIG. 3(b) has bottomed shape having an opening at the side of the inner reverse surface 3 (a downward side in the figure).

Incidentally, in the aforementioned FIG. 1 to FIG. 3, the position on which the bent part 7 is provided and its shape are illustrated by taking a downward-side surface as the inner reverse surface 3 and taking an upward-side surface as the outer front surface 5. However, the downward-side surface may be taken as the outer front surface 5 and the upward-side surface may be taken as the inner reverse surface 3. For example, in each glass 1 of (a) to (c) of FIG. 1, the configuration may be one where the outer front surface 5 has a planar shape and at least one place of the inner reverse surface 3 has a bent part 7, and a bent part 7 may be provided in at least one place of the inner reverse surface 3 and the outer front surface 5.

Average curvature is a physical index representing how a surface is deviated from a planar surface. Mathematical derivation of the average curvature is well known and is omitted in the present Description. Simply, the average curvature of a surface is determined as an intermediate value of the maximum value and the minimum value of curvature of a rotation body obtained by rotating a curved surface centering a normal vector of the curved surface at a certain point on the surface. Moreover, the average radius of curvature of a surface is determined as the reciprocal of the average curvature. Specifically, for example, as for a sphere having a radius of R, the average curvature at any point on the spherical surface thereof is 1/R. Furthermore, as for a cylinder whose radius of the bottom surface is R, the maximum curvature is 1/R and the minimum curvature is 0 at any point on the side surface thereof so that the average curvature is ½R. Therefore, the value of the average curvature at a certain point on a surface is an important parameter that represents a physical shape. The average curvature can be measured by a known arbitrary method.

Here, the average radius of curvature of the bent part 7 is preferably 30 cm or less, more preferably 10 cm or less, still preferably 5 cm of less, further preferably 3 cm or less, and most preferably 1 cm or less. In the case where the average radius of curvature is 30 cm or less, it can suitably follow to a component having a complex shape. In other words, in the case where the average radius of curvature of the bent part 7 is larger than 30 cm, there exists a component impossible to follow.

Gaussian curvature is a physical index representing how a surface is deviated from a planar surface. Mathematical derivation of the Gaussian curvature is well known and is omitted in the present Description. Simply, the Gaussian curvature K of a surface is determined as a product of main curvatures k1 and k2 of the surface at a certain point on the surface. That is, K=k1k2. For example, in the case where the Gaussian curvature of a surface is positive, as illustrated in FIG. 17, the surface has a bump or a peak at the point. In the case where the Gaussian curvature is negative, as illustrated in FIG. 18, the surface has a saddle point. However, in the case where the Gaussian curvature is 0, as illustrated in FIG. 19, the surface is equivalent to a flat surface at the point. For example, specifically, as illustrated in FIG. 20, a triangle depicted on a surface where the Gaussian curvature is positive (e.g., a spherical surface) has a sum of interior angles ($\alpha+\beta+\gamma$) of larger than 180°. As illustrated in FIG. 21, a triangle depicted on a surface where the Gaussian curvature is negative (e.g., a saddle surface) has a sum of interior angles ($\alpha+\beta+\gamma$) of smaller than 180°. Incidentally, a triangle depicted on a surface where the Gaussian curvature is 0 (e.g., a side surface of a column) has a sum of interior angles of equal to 180°. Therefore, the value of the Gaussian curvature at a certain point on a surface is an important parameter that represents a physical shape.

Here, the bent part 7 of the glass 1 can be made to have at least one place where the Gaussian curvature is not 0. In the case where the Gaussian curvature of the bent part 7 is not 0, it can suitably follow to a component having a complex shape. In other words, in the case where the Gaussian curvature of the bent part 7 is 0, there exists a component impossible to follow. Moreover, in the case where the Gaussian curvature of the bent part 7 of the glass 1 is not 0, rigidity can be enhanced as compared with the case where the glass curvature is 0. For example, in the case of a glass having a surface where the Gaussian curvature is 0 as illustrated in FIG. 19, the glass is easily bent in a certain direction but, in the case of a glass where the Gaussian curvature is not 0 as illustrated in FIG. 17 and FIG. 18, there is no direction in which the glass is easily bent.

The Gaussian curvature of the bent part 7 is preferably negative, more preferably −0.1 or less, and further preferably −0.3 or less. In the case where the Gaussian curvature of the bent part 7 is negative, particularly, it is suitable for utilization to interior members requiring a complex steric shape, such as a center console in transport devices.

Furthermore, in the case where there is an edge surface 9 connecting the inner reverse surface 3 and the outer front surface 5 like the glasses 1 of FIG. 2 and FIG. 3, the outline of the edge surface 9 is preferably a three-dimensional curve. Here, the "outline of the edge surface 9" means one having a minimum path length among curves that are closed on the edge surface 9 and that necessarily intersect any curves on the surface of the glass 1, which connects an arbitrary point on the inner reverse surface 3 and an arbitrary point on the outer front surface 5. The three-dimensional curve herein means a curve that cannot be depicted on a planar surface. For example, the outline of the edge surface 9 in the glass of FIG. 4 is an outline 9b indicated by a broken line.

(Production Method)

The method for producing the glass article according to the embodiment of the present invention is not particularly limited and those having various compositions can be used. For example, it can be produced by blending various raw materials in appropriate amounts, heating and melting them, subsequently homogenizing by defoaming or stirring, forming into a sheet by a well-known float process, down draw process (e.g., fusion process), press process or the like, cutting into a desired size after cooling slowly, subjecting the edge surface 9 to polishing, and providing a bent part 7 by an arbitrary method. According to the order of the steps, since it is sufficient to cut a sheet-like glass alone, the glass article can be efficiently produced. The order of the individual steps in the production method is not limited thereto. For example, it is also possible that the glass is formed into a sheet, and after annealing, a bent part 7 is provided by an arbitrary method, the glass is then cut into a desired size, and the edge surface 9 is subjected to polishing. Furthermore, after the bent part 7 is provided, the inner reverse surface 3 or the outer front surface 5 may be polished in order to remove defects in the bent part 7.

(Composition and Chemical Strengthening)

Examples of the glass 1 to be used in the embodiment of the present invention include glass articles composed of soda lime silicate glass, aluminosilicate glass, borate glass, lithium aluminosilicate glass, or borosilicate glass.

Moreover, the glass 1 is enhanced its strength and scratch resistance by performing chemical strengthening treatment to form a compressive stress layer on the surface thereof. Chemical strengthening is a treatment of forming a compressive stress layer on a glass surface by exchanging an alkali metal ion (typically Li ion or Na ion) having a smaller ion radius on the glass surface with another alkali metal ion (typically K ion) having a larger ion radius through ion exchange at a temperature equal to or lower than the glass transition point. The chemical strengthening treatment can be performed by a conventionally known method.

In order to perform such a chemical strengthening treatment appropriately, the glass 1 preferably has a total content of $Li_2O$ and $Na_2O$ of 12 mol % or more. Further, since the glass transition point is lowered and forming is facilitated as the content of $Li_2O$ increases, the glass 1 preferably has a content of $Li_2O$ of 0.5 mol % or more, more preferably 1.0 mol % or more, and further preferably 2.0 mol % or more. Furthermore, for increasing surface compressive stress (Compressive Stress: CS) and depth of compressive stress layer (Depth of Layer: DOL), the glass 1 preferably contains 60 mol % or more of $SiO_2$ and 8 mol % or more of $Al_2O_3$. Incidentally, the surface compressive stress of the chemically strengthened glass is preferably 300 MPa or more and the depth of compressive stress layer is preferably 10 μm or more. By controlling the surface compressive stress and depth of compressive stress layer of the chemically strengthened glass to these ranges, excellent strength and scratch resistance can be obtained.

As a specific composition of the glass article according to the embodiment of the present invention, there can be mentioned a glass containing, as a composition in terms of mol %, from 50 to 80% of $SiO_2$, from 0.1 to 25% of $Al_2O_3$, from 3 to 30% of $Li_2O+Na_2O+K_2O$, from 0 to 25% of MgO, from 0 to 25% of CaO, and from 0 to 5% of $ZrO_2$, but there is no particular limitation. More specifically, the following glass compositions may be mentioned. Incidentally, for example, "containing from 0 to 25% of MgO" means that MgO is not essential but may be contained up to 25%. The glass of (i) belongs to soda lime silicate glass and each glass of (ii) and (iii) belongs to aluminosilicate glass.

(i) A glass containing, as a composition in terms of mol %, from 63 to 73% of $SiO_2$, from 0.1 to 5.2% of $Al_2O_3$, from 10 to 16% of $Na_2O$, from 0 to 1.5% of $K_2O$, from 0 to 5.0% of $Li_2O$, from 5 to 13% of MgO, and from 4 to 10% of CaO, as a composition in terms of mol %

(ii) A glass containing from 50 to 74% of $SiO_2$, from 1 to 10% of $Al_2O_3$, from 6 to 14% of $Na_2O$, from 3 to 11% of $K_2O$, from 0 to 5.0% of $Li_2O$, from 2 to 15% of MgO, from 0 to 6% of CaO, and from 0 to 5% of $ZrO_2$, the sum of contents of $SiO_2$ and $Al_2O_3$ being 75% or less, the sum of contents of $Na_2O$ and $K_2O$ being from 12 to 25%, and the sum of contents of $MgO$ and $CaO$ being from 7 to 15%, as a composition in terms of mol %

(iii) A glass containing from 68 to 80% of $SiO_2$, from 4 to 10% of $Al_2O_3$, from 5 to 15% of $Na_2O$, from 0 to 1% of $K_2O$, from 0 to 5.0% of $Li_2O$, from 4 to 15% of $MgO$, and from 0 to 1% of $ZrO_2$, as a composition in terms of mol %

(iv) A glass containing from 67 to 75% of $SiO_2$, from 0 to 4% of $Al_2O_3$, from 7 to 15% of $Na_2O$, from 1 to 9% of $K_2O$, from 0 to 5.0% of $Li_2O$, from 6 to 14% of $MgO$, and from 0 to 1.5% of $ZrO_2$, the sum of contents of $SiO_2$ and $Al_2O_3$ being from 71 to 75%, the sum of contents of $Na_2O$ and $K_2O$ being from 12 to 20%, and the content of $CaO$ being less than 1% in the case where it is contained, as a composition in terms of mol %

(Surface Treatment)

In the glass 1, when external light such as illumination or sunlight is projected in a display surface, visibility is decreased by a reflection image. As countermeasures for suppressing the projection of the external light, there are a method of forming roughness on the inner reverse surface 3 or the outer front surface 5 of the glass 1 by performing an etching treatment with hydrofluoric acid to achieve antiglare properties, and a method of forming an antiglare film (antiglare layer) having roughness on the surface, on the inner reverse surface 3 or the outer front surface 5 of the glass 1. Accordingly, by making the glass surface rough thereby diffusively reflecting the external light, the reflection image is made unclear.

In the case of performing the etching treatment with hydrofluoric acid, it is achieved by a method of immersion in a chemical liquid such as a dipping method, a method of applying a chemical liquid such as a spin coating, a method of allowing a chemical liquid to flow, or the other method, similarly to a common wet etching treatment method. However, in the case of the etching treatment with hydrofluoric acid, there is a concern that nonuniformity remains on the inner reverse surface 3 or the outer front surface 5 and thus homogeneity is impaired. Particularly, since the glass 1 has a bent part 7 unlike the usual planar glass, the hydrofluoric acid solution may remain at the bent part 7, so that homogenization of the etching treatment is not easy.

Therefore, instead of the etching treatment with hydrofluoric acid or in combination with the etching treatment with hydrofluoric acid, it is preferable to perform a spray-coating treatment of the inner reverse surface 3 or the outer front surface 5 having a bent part 7 with a coating liquid having antiglare properties. For example, as in FIG. 5, in the case of the glass 1 where the outer front surface 5 has a bent part 7, by controlling a nozzle 11 of a spraying device so as to follow the shape of the bent part 7 as illustrated by an arrow A, it is possible to form a homogeneous antiglare film all over the whole outer front surface 5.

Examples of the nozzle 11 to be used for spray coating include a two-fluid nozzle, a one-fluid nozzle, and the like. The particle diameter of liquid drops of the coating liquid injected from the nozzle is usually from 0.1 to 100 µm and preferably from 1 to 50 µm. In the case where the particle diameter of the liquid drops is 1 µm or more, roughness that exhibits a sufficient antiglare effect can be formed within a short period of time. In the case where the particle diameter of the liquid drops is 50 µm or less, appropriate roughness that exhibits a sufficient antiglare effect is easily formed.

The particle diameter of the liquid drops can be appropriately controlled by the kind of the nozzle 11, spraying pressure, amount of liquid, and the like. For example, in the two-liquid nozzle, the liquid drops decreases in size as the spraying pressure increases and the liquid drops increases in size as the amount of liquid increases. The particle diameter of the liquid drops is a Sauter mean particle diameter that is measured by a laser measuring device.

FIG. 6 shows a relationship between haze values and gloss values of the glass surfaces in the case where various coating liquids are applied by spray coating. Incidentally, a black tape or the like is not attached to the surface opposite to the surface on which the haze value and the gloss value are measured. The coating liquid contains an alkoxysilane hydrolytic condensate that is a main substance of forming a scattered structure and scattering particles that are a scattering aid and the ratio and size of the scattering particles are different in individual coating liquids.

According to the spray coating method, it is possible to change the haze value and the gloss value in wider ranges. The reason thereof is considered that, since the coating amount and material composition of the coating liquid can be freely changed, the roughness level necessary for obtaining required properties can be relatively easily formed.

The gloss value and the haze value are sometimes measured with attaching a black tape or the like to the surface opposite to the measuring surface. The gloss value of the inner reverse surface 3 or the outer front surface 5 of the glass 1 having an antiglare film is preferably 30 or less, more preferably 28 or less, and further preferably 26 or less. In the case where the gloss value is 30 or less, the antiglare effect can be sufficiently exhibited. The gloss value of the glass 1 is preferably 20 or more and further preferably 21 or more. In the case where the gloss value is 20 or more, a decrease in contrast of an image can be suppressed.

The haze value of the inner reverse surface 3 or the outer front surface 5 of the glass 1 having an antiglare film is preferably 40% or less, more preferably 35% or less, and further preferably 30% or less. In the case where the haze value is 40% or less, a decrease in contrast can be sufficiently suppressed. The haze value of the inner reverse surface 3 or the outer front surface 5 of the glass 1 is preferably 15% or more, more preferably 16% or more, and further preferably 18% or more. In the case where the haze value is 15% or more, the antiglare effect can be sufficiently exhibited.

Here, the coating liquid to be used for spray coating preferably contains $SiO_2$ or a $SiO_2$ precursor. Since the coating liquid containing $SiO_2$ or a $SiO_2$ precursor is excellent in temporal stability of the liquid and can easily form a rough shape by spray coating, it is possible to control the gloss value of the inner reverse surface 3 or the outer front surface 5 to a value of from 20 to 30 and also control the haze value thereof to 40% or less to thereby realize good antiglare properties.

Moreover, since the reflectance of the antiglare film containing $SiO_2$ or a $SiO_2$ precursor becomes lower than the reflectance of the glass surface in the case where the etching treatment with hydrofluoric acid is performed, the spray coating treatment with the coating liquid containing $SiO_2$ or a $SiO_2$ precursor can achieve both of good antiglare properties and good antireflection.

At the time of applying the coating liquid by the spray method, a substrate is preferably heated at from 30 to 90° C. beforehand. In the case where the temperature of the substrate is 30° C. or higher, a liquid medium (C) is promptly evaporated, so that a sufficient roughness can be easily formed. In the case where the temperature of the substrate is 90° C. or lower, close adhesiveness between the substrate and the antiglare film becomes good.

By heating the glass 1 at the time of spray coating with the coating liquid, burning is performed simultaneously to application, or burning is performed by heating the antiglare film after application of the coating liquid on the glass 1. Particularly in the latter case, it is possible to omit the burning step by combining it with chemical strengthening step by performing it by the thermal treatment at the time of the chemical strengthening of the glass 1. An antiglare layer containing $SiO_2$ is formed by burning, and thereby chemical strength and mechanical strength of the inner reverse surface 3 or the outer front surface 5 is improved. Burning temperature is preferably from 200 to 480° C. In the case where the burning temperature is 200° C. or higher, sufficient close adhesiveness can be secured and, in the case where burning temperature is 480° C. or lower, crack generation in the film can be suppressed.

In the glass 1, in order to prevent the projection of an image caused by the reflection of the external light resulting in a screen being difficult to be seen, it is preferable to reduce reflectance by forming a monolayer or multilayer low reflection film or antireflection film on the inner reverse surface 3 or the outer front surface 5. As a configuration of the low reflection film at that time, use can be made of one obtained by alternately stacking a film composed of a material having a high refractive index and a film composed of a material having a low refractive index.

Examples of the methods for forming such a low reflection film include a wet coating method (a spray coating method, a spin coating method, a dip coating method, a die coating method, a curtain coating method, a screen coating method, an inkjet method, a flow coating method, a gravure coating method, a bar coating method, a flexo coating method, a slit coating method, a roll coating method, etc.), a sputtering method (a DC (direct current) sputtering method, an AC (alternate current) sputtering method, an RF (high frequency) sputtering method, etc.), and the like. Particularly, in the case of containing a bent part 7 as in the case of the glass 1 of the present embodiment, it is preferable to adopt a spray coating method. This is because it is possible to perform coating with following the curved surface of the bent part 7.

Since the glass 1 may be touched by a human finger on use, stains derived from finger print, sebum, sweat, and the like are prone to attach thereto. These stains are hard to remove when attached and are conspicuous depending on light and the like, so that there is a problem that visibility and good appearance are impaired. In order to solve such a problem, it is preferable to form an antifouling film (fingerprint-resistant film, antifinger-print film) on the glass 1. For the antifouling film, high water repellency and oil repellency are required in order to suppress the attachment of the stains and also abrasion resistance against wiping of the attached stains.

In order to satisfy these requirements, the antifouling film is preferably one composed of a fluorine compound. Examples of the forming method of the antifouling film include a spray coating method. For exhibiting the effect, the antifouling film is preferably provided as a uppermost layer of the glass 1.

For the glass 1 which may be touched with a human finger on use, good finger slipperiness is required. The finger slipperiness of the glass 1 can be evaluated by such indexes as a static friction coefficient and a dynamic friction coefficient. The inner reverse surface 3 or the outer front surface 5 of the glass 1 preferably has a static friction coefficient of 1.0 or less, more preferably 0.9 or less, and further preferably 0.8 or less. In the case where the static friction coefficient is 1.0 or less, the finger slipperiness is good at the time when a human finger touches the inner reverse surface 3 or the outer front surface 5 of the glass 1. Moreover, the inner reverse surface 3 or the outer front surface 5 preferably has a dynamic friction coefficient of 0.02 or less, more preferably 0.015 or less, and further preferably 0.01 or less. In the case where the dynamic friction coefficient is 0.02 or less, the finger slipperiness is good at the time when a human finger touches the inner reverse surface 3 or the outer front surface 5 of the glass 1. The static friction coefficient and the dynamic friction coefficient of the inner reverse surface 3 or the outer front surface 5 of the glass 1 can be, for example, measured as follows. In a touch angle evaluation meter TL201 Ts manufactured by Trinity-Lab Inc., a pseudo-finger contactor manufactured by the same company is placed on the inner reverse surface 3 or the outer front surface 5 of the glass 1 in a state of applying a load of 30 g. This is moved on the inner reverse surface 3 or the outer front surface 5 at a rate of 10 mm/second and the static friction coefficient and the dynamic friction coefficient are measured. A friction coefficient at the time when the contactor begins moving from a stationary state is defined as the static friction coefficient and a friction coefficient at the time when the contactor is moving is defined as the dynamic friction coefficient.

For satisfying such numerical ranges of the static friction coefficient and the dynamic friction coefficient, it is preferable to subject the inner reverse surface 3 or the outer front surface 5 to a treatment of the antifouling film or the like.

(Printing)

The glass 1 is not limited to clear one and, for the purpose of enhancing aesthetic quality of the glass 1, displaying the function of an interior member on which the glass 1 is mounted, or the like, may be one where an arbitrary pattern is printed on the inner reverse surface 3 or on the outer front surface 5.

For example, in the case where the glass 1 is used as a cover glass of a shift knob of an automobile, usually, since the shift knob is composed of a complex curved surface, a bent part 7 having a complex curvature is provided on the inner reverse surface 3 or the outer front surface 5 of the glass 1 that covers the shift knob. In this case, when it is intended to print an arbitrary pattern (e.g., a pattern indicating shift positions or the other pattern) on the bent part 7, it is suitable to perform printing by a pad printing method.

Here, the pad printing method is a method of printing by pressing a soft pad (e.g., a silicone-made pad) having an ink pattern provided on the surface thereof to an objective substrate to transfer the ink pattern onto the substrate surface. This printing method is sometimes called a "pat" printing or a "tampo" printing. Since a relatively soft pad having a good shape followability is used in the pad printing, it is preferable to perform printing by the pad printing method for the bent part 7 of the glass 1.

Particularly, in the case where the Gaussian curvature at the bent part 7 of the glass 1 is not zero, it is more preferable to perform printing by the pad printing method.

On the other hand, the printing method such as a screen printing method is not suitable because the shape followability is not so high and there is a possibility of dripping ink from the bent part 7. Incidentally, the screen printing is a method of placing a printing material on a screen having openings and subsequently pressing and sliding a squeegee on the screen to squeeze out the printing material from the openings of the screen, thereby printing a pattern of the openings.

FIG. 7 illustrates the glass 1 where the inner reverse surface 3 has a planar part 6 and a bent part 7 connecting to the both edge parts at the longitudinal direction of the planar part 6 in which a printing has been performed on the both edge parts at the longitudinal direction of the inner reverse surface 3. The shape of the glass 1 is about the same as the shape of the glass 1 of FIG. 2(a) and FIG. 4 mentioned above. In FIG. 7, the portion illustrated by polka-dot hatching is a printed portion. As above, in the case where the glass 1 has the planar part 6 connecting to the bent part 7, when a linear pattern is printed by the pad printing method to the bent part 7 and the planar part 6, the outer circumference of the pad becomes an arc shape. Therefore, particularly in the planar part 6, a boundary line B between the portion on which a pattern is printed and the portion on which it is not printed is difficult to make linear. Accordingly, by printing a pattern by the pad printing onto the bent part 7 and printing a pattern by the screen printing onto the planar part 6, the boundary line B can be made linear and thus aesthetic quality can be enhanced.

Incidentally, the printing onto the planar part 6 is not limited to one by the screen printing method and may be one by a rotary screen printing method, a letterpress printing method, an offset printing method, a spray printing method, or the like as long as it is one which the boundary line B between the portion on which a pattern is printed and the portion on which it is not printed can be made linear. Moreover, it may be a print by an electrostatic copying method, a thermal transfer method, an inkjet method, or the like. Of these, in particular, according to the spray printing method, printing can be suitably performed onto the bent part 7 of the glass 1 similarly to the pad printing method. Moreover, also in the case of printing the linear pattern as illustrated in FIG. 7, the boundary line B can be made linear by masking the portion not to be printed and thus the aesthetic quality can be enhanced.

(Laminated Glass and Bilayer Glass)

The glass 1 may be a glass article having a film (so-called bilayer glass) where a resin film as a functional film is attached onto the inner reverse surface 3 or the outer front surface 5. Moreover, the glass 1 may be made a laminated glass article by laminating one pair thereof.

In the case of the laminated glass article, at least one sheet of a film having an optical function or an antiscattering function may be disposed between one pair of the glasses 1. FIG. 8 illustrates a laminated glass article where an antiscattering film 13 and an optically functional film 15 are disposed between one pair of the glasses 1. A synthetic resin film 17 having adhesiveness is disposed between the glass 1 and the antiscattering film 13, between the antiscattering film 13 and the optically functional film 15 and between the optically functional film 15 and the glass 1.

In such a laminated glass article, one pair of the glasses 1 are combined by heating to a predetermined temperature, for example, 100° C. or higher and subsequently pressurizing them to achieve crimping. Here, in FIG. 8, the antiscattering film 13 and the optically functional film 15 are represented as planar ones but it is preferable to form them into a shape that matches to the shape of the glass 1, that is, a curved shape almost parallel to the bent part 7 of the glass 1 in advance before the pressurization and crimping. Thereby, it becomes possible to crimp the antiscattering film 13 and the optically functional film 15 surely to one pair of the glasses 1. This method is particularly effective in the case where the antiscattering film 13 and the optically functional film 15 are composed of materials that are not easily deformed.

(Strength and Support Member)

Particularly in the case of being used as an interior member of a transportation device, the aforementioned glass 1 (including a bilayer glass article and a laminated glass article) is required to have especially high strength in view of the use application. Accordingly, in order to improve strength, the glass 1 is fixed to the interior member in such a manner that at least a part of the inner reverse surface 3 or the outer front surface 5 is supported by a support member provided on the interior member or the like of the transportation device.

Hereinafter, in the case where a glass 1 where the inner reverse surface 3 or the outer front surface 5 has the planar part 6 and the bent part 7 connecting to the both edge parts at the longitudinal direction of the planar part 6, as illustrated in (a) of FIG. 2, FIG. 4, FIG. 7, and the like, is supported by a support member 20 of an interior member, the strength of the glass 1 is investigated. As for the support member 20, there may be mentioned a polymer material such as polycarbonate, polyethylene terephthalate (PET), ABS, or a synthetic rubber, a metal material such as aluminum or SUS, a ceramic material, and the like.

In such a glass 1, a part of the edge surface 9 connecting the inner reverse surface 3 and the outer front surface 5 is composed of a bent part edge surface 9a connecting the bent part 7 of the inner reverse surface 3 and the bent part 7 of the outer front surface 5. That is, there is a characteristic in that the bent parts 7 of the inner reverse surface 3 and the outer front surface 5 are provided so as to connect to a part of the edge surface 9 of the glass 1. FIG. 9 to FIG. 14 illustrate those in which the shape of the support member 20 is changed to one of support shapes 1 to 5 to be mentioned later and the supporting configuration of the glass 1 by the support member 20 is changed. Incidentally, in FIG. 9 to FIG. 14, the longitudinal direction of the glass 1 is represented as X, the short direction is represented as Y, and the thickness direction is represented as Z.

(Support Shape 1)

FIG. 9 illustrates a support member 20 having a support surface 21 almost parallel to the inner reverse surface 3. The support surface 21 has a support planar surface 23 that supports facing the planar part 6 of the inner reverse surface 3 and a support bent surface 25 that supports facing the bent part 7 of the inner reverse surface 3. The support surface 21 extends to both sides in Y-direction more than the glass 1. The support bent surface 25 may be adhesively fixed to the bent part 7 of the inner reverse surface 3 with an adhesive or may support the bent part 7 so as to be movable without adhesive fixing.

(Support Shape 2)

In the support member 20 of FIG. 10, a concave part 26 is provided on a portion excluding a side edge part at X-direction of the support bent surface 25. Therefore, the support bent surface 25 only supports the side edge part at X-direction of the bent part 7 of the inner reverse surface 3. Incidentally, the support bent surface 25 and the bent part 7 are adhesively fixed.

In the support member 20 of FIG. 11, the concave part 26 provided on the support bent surface 25 extends to the X-direction more than the support member 20 of FIG. 10 but the basic configuration is the same. The support member 20 of FIG. 11 is different from the support member 20 of FIG. 10 in view that the support bent surface 25 and the bent part 7 of the inner reverse surface 3 are not adhesively fixed and the support bent surface 25 supports the bent part 7 so as to be movable.

(Support Shape 3)

The support surface 21 of the support member 20 of FIG. 12 has a support convex surface 27 that is protrusively provided from a side edge part at the X-direction in a perpendicular direction to a normal line of the bent part 7 and supports the bent part edge surface 9a. The configuration other than the support convex surface 27 is the same as that of the support member 20 of FIG. 9. The support convex surface 27 may be adhesively fixed to the bent part edge surface 9 with an adhesive or may support the bent part edge surface 9 so as to be movable without being adhesively fixed.

(Support Shape 4)

The support member 20 of FIG. 13 is different from the support member 20 of FIG. 12 in view that the former has a side support surface 28 that is protrusively provided from a side edge part at the Y-direction of the support bent surface 25 in a perpendicular direction to a normal line of the bent part 7 of the glass 1 and supports the side surface at the Y-direction of the glass 1 from the Y-direction. The side support surface 28 may be adhesively fixed to the side surface at the Y-direction of the glass 1 with an adhesive or may support the side surface at the Y-direction of the glass 1 so as to be movable without being adhesively fixed.

(Support Shape 5)

The support member 20 of FIG. 14 is different in configuration from the support member 20 of FIG. 13 in view that the support convex surface 27 that supports the bent part edge surface 9a is not provided. That is, the support member 20 of FIG. 14 is different in configuration from the support member 20 of FIG. 9 in view that the former has the side support surface 28.

For the glass 1 supported by the support member 20 of each of the support shapes 1 to 5, a strength test as mentioned below was performed.

(Bent Part Strength Test)

A bent part strength test was performed by dropping a sphere 30 from the upper side of the bent part 7 of the glass 1 while the lower surface 29 of the support member 20 was completely restrained, as illustrated in FIG. 15. The strength test is a test according to simulation. The sphere 30 is a rigid body and has a diameter of 165 mm, a mass of 6.8 kg, and an impact energy of 150 J. The center O of the sphere 30 at the time of dropping was matched to the middle position Ym in Y-direction of the glass 1 and the boundary position Xb in X-direction between the planar part 6 and the bent part 7 of the glass 1. The glass 1 has an X-direction size of 257 mm, a Y-direction size of 183 mm, and a Z-direction size of 6.7 mm. Also, the bent part 7 has an X-direction size of 14.3 mm, a Y-direction size of 183 mm, a Z-direction size of 6.7 mm, and an average radius of curvature of R23 mm. The material of the support member 20 was a polymer material (polycarbonate).

(Planar Part Strength Test)

A planar part strength test was performed by dropping a sphere 30 from the upper side of the planar part 6 of the glass 1 while the lower surface 29 of the support member 20 was completely restrained, as illustrated in FIG. 16. The center O of the sphere 30 at the time of dropping was matched to the middle position Ym in Y-direction of the glass 1 and the middle position Xm in X-direction of the glass 1. The other conditions are the same as in the bent part strength test.

Table 1 shows results of the bent part strength test of the glass 1 supported by the support member 20 of each of the support shapes 1 to 5.

TABLE 1

| | Presence of adhesive | Maximum stress of bent part edge surface (MPa) | Stress in Y-direction of bent part edge surface (MPa) | Maximum stress of outer front surface (MPa) | Maximum stress of inner reverse surface (MPa) |
|---|---|---|---|---|---|
| Support shape 1 (FIG. 9) | present | 600 | 45 | 2850 | 3520 |
| Support shape 1 (FIG. 9) | absent | 600 | 10 | 990 | 3620 |
| Support shape 2 (FIG. 10) | present | 640 | 500 | 2210 | 2430 |
| Support shape 2 (FIG. 11) | absent | 800 | 30 | 1340 | 1730 |
| Support shape 3 (FIG. 12) | present | 560 | 100 | 2840 | 3530 |
| Support shape 3 (FIG. 12) | absent | 560 | 40 | 1090 | 3600 |
| Support shape 4 (FIG. 13) | present | 560 | 100 | 2850 | 3550 |
| Support shape 4 (FIG. 13) | absent | 600 | 40 | 1000 | 3620 |
| Support shape 5 (FIG. 14) | present | 600 | 40 | 2860 | 3570 |
| Support shape 5 (FIG. 14) | absent | 600 | 10 | 1110 | 3600 |

Table 1 shows the presence or absence of the adhesive that adheres the support member 20 and the glass 1, maximum stress of the bent part edge surface 9a of the glass 1, stress in Y-direction of the bent part edge surface 9a, maximum stress of the outer front surface 5, and maximum stress of the inner reverse surface 3. Of the stress of each part, most important for damage avoidance of the bent part 7 of the glass 1 is the stress of the bent part edge surface 9a, particularly the stress in Y-direction. This is because the edge surface of the glass 1 is generally a portion that has the lowest strength and is easily cracked in the glass 1 since the portion is subjected to cutting, polishing, chamfering, and the like, and a crack extends in the X-direction by the stress in Y-direction in many cases.

In any support shape, the maximum stress in Y-direction of the bent part edge surface 9a remarkably decreases in the case of the absence of the adhesive as compared with the case of the presence of the adhesive. This is because, in the case of the absence of the adhesive, the bent part 7, the bent part edge surface 9a, and the side surface in Y-direction of the glass 1 is movable and thus it is possible to disperse the stress at the time of applying an impact load by the sphere 30.

When the support shape 1 having the support bent surface 25 facing the bent part 7 of the inner reverse surface 3 is compared with the support shape 2 where the concave part 26 is provided on the support bent surface 25, the maximum stress in Y-direction of the bent part edge surface 9a is 45 MPa (presence of the adhesive) and 10 MPa (absence of the adhesive) in the support shape 1, while it is 500 MPa (presence of the adhesive) and 30 MPa (absence of the adhesive) in the support shape 2. Therefore, it is found that the stress decreases in the support shape 1. As above, the bent part 7 is preferably supported by the support bent surface 25 facing the bent part 7. Incidentally, the reason why the bent part 7 is preferably supported by the support bent surface 25 is that the stress of the bent part edge surface 9a can be reduced by suppressing the deformation of the bent part 7.

When the support shape 1 having no support convex surface 27 is compared with the support shape 3 having the support convex surface 27, the maximum stress in Y-direction of the bent part edge surface 9a is 45 MPa (presence of the adhesive) and 10 MPa (absence of the adhesive) in the support shape 1, while it is 100 MPa (presence of the adhesive) and 40 MPa (absence of the adhesive) in the support shape 3. Therefore, it is found that the stress decreases in the support shape 1. Also, when the support shape 5 having no support convex surface 27 is compared with the support shape 4 having the support convex surface 27, the maximum stress in Y-direction of the bent part edge surface 9a is 40 MPa (presence of the adhesive) and 10 MPa (absence of the adhesive) in the support shape 5, while it is 100 MPa (presence of the adhesive) and 40 MPa (absence of the adhesive) in the support shape 4. Therefore, it is found that the stress decreases in the support shape 5. As above, the bent part edge surface 9a is preferably configured so that the support convex surface 27 does not come into contact therewith. The reason why the bent part edge surface 9a is preferably not supported by the support convex surface 27 is that the stress in Y-direction can be reduced by securing the degree of freedom in the deformation of the bent part 7.

When the support shape 1 having no side support surface 28 is compared with the support shape 5 having the side support surface 28, the maximum stress in Y-direction of the bent part edge surface 9a is 40 MPa (presence of the adhesive) and 10 MPa (absence of the adhesive) in the support shape 5, while it is 45 MPa (presence of the adhesive) and 10 MPa (absence of the adhesive) in the support shape 1. It is found that the numerical values almost do not change. Also, when the support shape 3 having no side support surface 28 is compared with the support shape 5 having the side support surface 28, the maximum stress in Y-direction of the bent part edge surface 9a is 100 MPa (presence of the adhesive) and 40 MPa (absence of the adhesive) in the support shape 4, while it is 100 MPa (presence of the adhesive) and 40 MPa (absence of the adhesive) in the support shape 3. The numerical values are equal. As above, the side support surface 28 does not contribute the improvement in the strength of the bent part 7 of the glass 1 but may be provided for positioning in the Y-direction of the glass 1.

Table 2 shows results of the planar part strength test of the glass 1 supported by the support member 20 of the support shape 1.

TABLE 2

| | Presence of adhesive | Maximum stress of bent part edge surface (MPa) | Stress in Y-direction of bent part edge surface (MPa) | Maximum stress of outer front surface (MPa) | Maximum stress of inner reverse surface (MPa) |
|---|---|---|---|---|---|
| Support shape 1 (FIG. 9) | present | — | — | 970 | 910 |

From Table 2, it is found that large stress is not generated on the bent part edge surface 9a in the case where impact is imparted to the planar part.

Incidentally, the material of the support member 20 is not limited to the polymer material (polycarbonate) and any material may be applied as long as it has the Young's modulus of the support member 20 is from 0.02 to 1.5 times the Young's modulus of the glass 1. In the case where the Young's modulus of the support member 20 is 0.02 times the Young's modulus of the glass 1 or more, the stress of the bent part edge surface 9a decreases and, in the case where it is 1.5 times or less, the stress of the outer front surface 5 and the inner reverse surface 3 decreases.

The present application is based on Japanese Patent Application No. 2014-101775 filed on May 15, 2014, and the contents are incorporated herein by reference.

DESCRIPTION OF REFERENCE NUMERALS AND SIGNS

1 Glass
3 Inner reverse surface (first surface)
5 Outer front surface (second surface)
6 Planar part
7 Bent part
9 Edge surface
9a Bent part edge surface
9b Outline
11 Nozzle
13 Antiscattering film
15 Optically functional film
17 Synthetic resin film
20 Support member
21 Support surface
23 Support planar surface
25 Support bent surface
27 Support convex surface
28 Side support surface
29 Lower surface
30 Sphere

The invention claimed is:

1. An interior assembly for transportation device, comprising:
a glass article; and
a support member supporting the glass article,
wherein the glass article comprises:
a glass comprising a first surface and a second surface;
a resin film attached onto the first surface or the second surface of the glass; and
an antifouling film forming an outermost surface of the interior assembly and comprising a fluorine compound,
the glass has a composition comprising, in terms of mol %, from 50 to 74% of $SiO_2$, from 1 to 10% of $Al_2O_3$, from 6 to 14% of $Na_2O$, from 3 to 11% of $K_2O$, from 0 to 5.0% of $Li_2O$, from 2 to 15% of MgO, from 0 to 6% of CaO, and from 0 to 5% of $ZrO_2$, such that a sum of contents of $SiO_2$ and $Al_2O_3$ is 75% or less, a sum of contents of $Na_2O$ and $K_2O$ is from 12 to 25%, and a sum of contents of MgO and CaO is from 7 to 15%,
the first surface or the second surface of the glass has a roughness having an antiglare property,
the glass has a haze value of 40% or less,
the glass has a bent part comprising at least one site having a Gaussian curvature of −0.1 or less,
the antifouling film is formed such that the outermost surface of the interior assembly has a coefficient of static friction of 1.0 or less, where the coefficient of static friction is measured by placing a pseudo-finger contactor on the outermost surface of the interior assembly and moving the pseudo-finger contactor at a rate of 10 mm/second in a state of applying a load of 30 g, and the interior assembly is selected from the group consisting of an instrument panel, a head-up display, a dashboard, a center console, and a shift knob.

2. The interior assembly for transportation device according to claim 1, wherein the second surface of the glass is on an outer front surface side of the interior assembly and the resin film is attached onto the second surface of the glass.

3. The interior assembly for transportation device according to claim 2, wherein the antifouling film is on the second surface of the glass such that the antifouling film forms the outermost surface of the interior assembly.

4. The interior assembly for transportation device according to claim 1, wherein the resin film has an optical function.

5. The interior assembly for transportation device according to claim 1, wherein the glass article further comprises a synthetic resin film having adhesiveness and disposed between the glass and the resin film or disposed on the resin film.

6. The interior assembly for transportation device according to claim 1, wherein the glass article comprises
two sheets or more of the glass,
and the resin film is disposed between the sheets of the glass.

7. The interior assembly for transportation device according to claim 1, wherein the bent part comprises at least one site having an average radius of curvature of 30 cm or less.

8. The interior assembly for transportation device according to claim 1, wherein the at least one site of the bent part has the Gaussian curvature of −0.3 or less.

9. The interior assembly for transportation device according to claim 1, wherein the glass article further comprises a low reflection film on the first surface or the second surface of the glass.

10. The interior assembly for transportation device according to claim 1, wherein the glass has a haze value of 35% or less.

11. The interior assembly for transportation device according to claim 1, wherein the outermost surface of the interior assembly has a coefficient of dynamic friction of 0.02 or less, where the coefficient of dynamic friction is measured by placing a pseudo-finger contactor on the outermost surface of the interior assembly and moving the pseudo-finger contactor at a rate of 10 mm/second in a state of applying a load of 30 g.

12. The interior assembly for transportation device according to claim 1, wherein the glass article further comprises
an arbitrary pattern printed on the first surface or the second surface of the glass.

13. The interior assembly for transportation device according to claim 1, wherein the glass comprises $Li_2O$ and $Na_2O$ in a total content of 12 mol % or more.

14. The interior assembly for transportation device according to claim 1, wherein the glass comprises 0.5 mol % or more of $Li_2O$.

15. The interior assembly for transportation device according to claim 1, wherein the glass comprises 60 mol % or more of $SiO_2$ and 8 mol % or more of $Al_2O_3$.

16. The interior assembly for transportation device according to claim 1, wherein the glass comprises a surface compressive stress layer.

17. The interior assembly for transportation device according to claim 16, wherein the surface compressive stress layer has a surface compressive stress of 300 MPa or more.

18. The interior assembly for transportation device according to claim 16, wherein the surface compressive stress layer has a depth of 10 μm or more.

19. The interior assembly for transportation device according to claim 1, wherein the interior assembly is a shift knob.

20. The interior assembly for transportation device according to claim 1, wherein
the support member comprises at least one selected from the group consisting of polycarbonate, polyethylene terephthalate (PET), acrylonitrile butadiene styrene (ABS), a synthetic rubber, aluminum, stainless steel (SUS), and a ceramic material.

21. The interior assembly for transportation device according to claim 1, wherein the support member faces the bent part.

22. The interior assembly for transportation device according to claim 1, wherein the bent part of the glass comprises an edge surface connecting the first surface and the second surface, and the edge surface of the bent part does not contact the support member.

23. A method for producing the interior assembly for transportation device according to claim 1, the method comprising:
heating two sheets or more of glass comprising a first surface and a second surface, and at least one sheet of a resin film or a synthetic resin film having adhesiveness disposed between the sheets of glass to a predetermined temperature;
subsequently pressurizing and crimping the sheets of glass and the resin film or the synthetic resin film; and
forming an antifouling film comprising a fluorine compound on the first surface or the second surface of the glass such that the antifouling film forms an outermost surface of the interior assembly.

24. The method according to claim 23, wherein the resin film is used in the heating, and the resin film has an optical function.

25. The method according to claim 23, wherein the at least one site of the bent part has the Gaussian curvature of −0.3 or less.

26. The method according to claim 23, further comprising:
forming the resin film, which is used in the heating, into a curved shape before the pressurization and crimping.

27. The method according to claim 23, wherein the roughness is formed by performing etching on the first surface or the second surface of the glass before the crimping.

28. The method according to claim 23, wherein the glass is chemically strengthened.

29. The method according to claim 23, further comprising:
forming a low reflection film on the first surface or the second surface of the glass.

30. The method according to claim 23, wherein the antifouling film is formed by spray coating the first surface or the second surface of the glass with a composition comprising the fluorine compound.

31. The method according to claim 23, wherein the glass comprises an arbitrary pattern printed on the first surface or the second surface.

32. The interior assembly for transportation device according to claim 1, wherein the glass is at least one selected from the group consisting of soda lime silicate glass, aluminosilicate glass, borate glass, lithium aluminosilicate glass, and borosilicate glass.

33. The interior assembly for transportation device according to claim 1, wherein the glass article further comprises
a synthetic resin film having adhesiveness,
the interior assembly comprises two sheets or more of the glass, and
the synthetic resin film is disposed between the sheets of the glass and the resin film such that the sheets of the glass and the resin film are adhered to each other via the synthetic resin film to form a laminated glass article.

34. The interior assembly for transportation device according to claim 33, wherein the resin film has an optical function.

35. The interior assembly for transportation device according to claim 1, wherein the glass article further comprises
a synthetic resin film having adhesiveness,
the interior assembly comprises two sheets of the glass, and
the synthetic resin film is disposed between the sheets of the glass and the resin film such that the sheets of the glass and the resin film are adhered to each other via the synthetic resin film to form a laminated glass article.

36. The interior assembly for transportation device according to claim 35, wherein the resin film has an optical function.

37. The interior assembly for transportation device according to claim 1, wherein the bent part of the glass is not in contact with the support member.

38. The interior assembly for transportation device according to claim 1, wherein the glass has the bent part such that the outermost surface of the interior assembly has a saddle point.

39. An interior assembly for transportation device, comprising:
a glass article; and
a support member supporting the glass article,
wherein the glass article comprises:
a glass comprising a first surface and a second surface;
a resin film attached onto the first surface or the second surface of the glass; and
an antifouling film forming an outermost surface of the interior assembly and comprising a fluorine compound,
the glass has a composition comprising, in terms of mol %, from 50 to 74% of $SiO_2$, from 1 to 10% of $Al_2O_3$, from 6 to 14% of $Na_2O$, from 3 to 11% of $K_2O$, from 0 to 5.0% of $Li_2O$, from 2 to 15% of MgO, from 0 to 6% of CaO, and from 0 to 5% of $ZrO_2$, such that a sum of contents of $SiO_2$ and $Al_2O_3$ is 75% or less, a sum of contents of $Na_2O$ and $K_2O$ is from 12 to 25%, and a sum of contents of MgO and Cao is from 7 to 15%,
wherein the first surface or the second surface of the glass has a roughness having an antiglare property,
the glass has a haze value of 40% or less,
the glass has a bent part comprising at least one site having a negative Gaussian curvature,
the antifouling film is formed such that the outermost surface of the interior assembly has a coefficient of static friction of 1.0 or less, where the coefficient of static friction is measured by placing a pseudo-finger contactor on the outermost surface of the interior assembly and moving the pseudo-finger contactor at a rate of 10 mm/second in a state of applying a load of 30 g, and
the interior assembly is selected from the group consisting of an instrument panel, a head-up display, a dashboard, a center console, and a shift knob.

40. The interior assembly for transportation device according to claim 39, wherein the at least one site of the bent part has the Gaussian curvature of from −0.3 to −0.1.

41. An interior assembly for transportation device, comprising:
a glass article; and
a support member supporting the glass article,
wherein the glass article comprises:
a glass comprising a first surface and a second surface;
a resin film attached onto the first surface or the second surface of the glass; and
an antifouling film forming an outermost surface of the interior assembly and comprising a fluorine compound,
the first surface or the second surface of the glass has a roughness having an antiglare property,
the glass has a haze value of 40% or less,
the glass has a bent part comprising at least one site having a Gaussian curvature of −0.1 or less,
the interior assembly is selected from the group consisting of an instrument panel, a head-up display, a dashboard, a center console, and a shift knob, and
the bent part of the glass is not fixed to the support member by an adhesive, and the glass is movable on the support member.

* * * * *